US009666357B2

(12) United States Patent
Keeling

(10) Patent No.: US 9,666,357 B2
(45) Date of Patent: May 30, 2017

(54) APPARATUS SYSTEM, AND METHOD FOR WIRELESSLY RECEIVING POWER USING CONDUCTIVE STRUCTURES

(71) Applicant: QUALCOMM Incorporated, San Diego, CA (US)

(72) Inventor: Nicholas A Keeling, Auckland (NZ)

(73) Assignee: QUALCOMM Incorporated, San Diego, CA (US)

( * ) Notice: Subject to any disclaimer, the term of this patent is extended or adjusted under 35 U.S.C. 154(b) by 1119 days.

(21) Appl. No.: 13/791,538

(22) Filed: Mar. 8, 2013

(65) Prior Publication Data

US 2014/0070764 A1    Mar. 13, 2014

Related U.S. Application Data

(60) Provisional application No. 61/699,717, filed on Sep. 11, 2012, provisional application No. 61/699,700,
(Continued)

(51) Int. Cl.
  *H02J 7/00*        (2006.01)
  *H01F 38/14*       (2006.01)
(Continued)

(52) U.S. Cl.
  CPC ............ *H01F 38/14* (2013.01); *B60L 11/182* (2013.01); *B60L 11/1833* (2013.01);
(Continued)

(58) Field of Classification Search
  CPC ....................................................... H02J 7/025
(Continued)

(56) References Cited

U.S. PATENT DOCUMENTS 6,028,429 A    2/2000  Green et al.
6,624,529 B2*  9/2003  Obayashi ................. H02J 1/14
                                            290/40 B
(Continued)

FOREIGN PATENT DOCUMENTS

CN       1813384 A     8/2006
CN     101573851 A    11/2009
(Continued)

OTHER PUBLICATIONS

Chawla, et al., "State of the Art in Inductive Charging for Electronic Appliances and its Future in Transportation," 2012 Florida Conference on Recent Advances in Robotics, Boca Raton, Florida, May 10-11, 2012, pp. 1-7.
(Continued)

*Primary Examiner* — Yalkew Fantu
(74) *Attorney, Agent, or Firm* — James Gutierrez

(57) ABSTRACT

This disclosure provides systems, methods and apparatus for wireless power transfer. In one aspect, an apparatus is provided that includes a first conductive structure configured to wirelessly receive power via a magnetic field generated by a transmitter conductive structure having a length greater than a width. The first conductive structure has a length greater than a width and includes co-planar loops enclosing first and second areas. The first conductive structure has first and second edges each intersecting a first geometric line running along the length of the first conductive structure. The apparatus includes a second conductive structure configured to wirelessly receive power via the magnetic field. The second conductive structure has a length greater than a width. The first geometric line runs along the length of the second conductive structure. The first geometric line is substantially perpendicular to a second geometric line running along the length of the transmitter conductive structure.

32 Claims, 25 Drawing Sheets

Related U.S. Application Data filed on Sep. 11, 2012, provisional application No. 61/704,265, filed on Sep. 21, 2012.

(51) Int. Cl.

| | | |
|---|---|---|
| *H02J 50/50* | (2016.01) | |
| *H02J 50/10* | (2016.01) | |
| *B60L 11/18* | (2006.01) | |
| *H04B 5/00* | (2006.01) | |
| *H02J 5/00* | (2016.01) | |
| *H02J 7/02* | (2016.01) | |
| *H02J 17/00* | (2006.01) | |
| *H01F 27/38* | (2006.01) | |
| *H01F 3/00* | (2006.01) | |
| *H01F 5/02* | (2006.01) | |

(52) U.S. Cl.
CPC ............. *H01F 27/38* (2013.01); *H02J 5/005* (2013.01); *H02J 7/025* (2013.01); *H02J 17/00* (2013.01); *H02J 50/10* (2016.02); *H02J 50/50* (2016.02); *H04B 5/0037* (2013.01); *H01F 2003/005* (2013.01); *H01F 2005/027* (2013.01); *Y02T 10/7005* (2013.01); *Y02T 10/7072* (2013.01); *Y02T 90/12* (2013.01); *Y02T 90/121* (2013.01); *Y02T 90/122* (2013.01); *Y02T 90/125* (2013.01); *Y02T 90/14* (2013.01); *Y02T 90/168* (2013.01); *Y04S 30/12* (2013.01)

(58) Field of Classification Search
USPC .......................................................... 320/108
See application file for complete search history.

(56) References Cited

U.S. PATENT DOCUMENTS

| | | | |
|---|---|---|---|
| 7,880,337 B2 | 2/2011 | Farkas | |
| 7,969,269 B2 | 6/2011 | Boys | |
| 8,260,199 B2 | 9/2012 | Kowalski | |
| 2002/0113441 A1* | 8/2002 | Obayashi | H02J 1/14 290/40 C |
| 2007/0001666 A1 | 1/2007 | Lee | |
| 2007/0145830 A1 | 6/2007 | Lee et al. | |
| 2007/0210889 A1 | 9/2007 | Baarman et al. | |
| 2008/0079392 A1* | 4/2008 | Baarman | H02J 7/0072 320/108 |
| 2008/0084179 A1* | 4/2008 | Emori | H02J 7/0016 320/109 |
| 2009/0271047 A1 | 10/2009 | Wakamatsu | |
| 2010/0052431 A1 | 3/2010 | Mita | |
| 2010/0109444 A1 | 5/2010 | Lemmens | |
| 2010/0134096 A1 | 6/2010 | Chiba et al. | |
| 2010/0244582 A1 | 9/2010 | Yoshikawa | |
| 2011/0109239 A1 | 5/2011 | Kojima | |
| 2011/0259960 A1 | 10/2011 | Baarman et al. | |
| 2011/0273177 A1 | 11/2011 | McGinley et al. | |
| 2012/0086281 A1 | 4/2012 | Kanno | |
| 2012/0139358 A1 | 6/2012 | Teggatz et al. | |
| 2012/0161530 A1* | 6/2012 | Urano | H02J 7/025 307/104 |
| 2012/0161539 A1 | 6/2012 | Kim et al. | |
| 2012/0169139 A1 | 7/2012 | Kudo | |
| 2014/0070622 A1 | 3/2014 | Keeling et al. | |
| 2014/0070623 A1 | 3/2014 | Keeling et al. | |
| 2015/0094887 A1* | 4/2015 | Kawashima | B60L 11/182 701/22 |

FOREIGN PATENT DOCUMENTS

| | | |
|---|---|---|
| CN | 101971453 A | 2/2011 |
| CN | 102089952 A | 6/2011 |
| CN | 102362406 A | 2/2012 |
| CN | 102577011 A | 7/2012 |
| CN | 102577026 A | 7/2012 |
| CN | 102625750 A | 8/2012 |
| EP | 0968437 A1 | 1/2000 |
| WO | WO-2008137996 A1 | 11/2008 |
| WO | WO-2008140333 A2 | 11/2008 |
| WO | WO-2009050625 A2 | 4/2009 |
| WO | WO-2009122355 A2 | 10/2009 |
| WO | 2010090539 A1 | 8/2010 |
| WO | 2011016737 | 2/2011 |
| WO | WO-2011148289 A2 | 12/2011 |
| WO | WO-2012018269 A1 | 2/2012 |
| WO | WO-2012095896 A1 | 7/2012 |

OTHER PUBLICATIONS

International Search Report and Written Opinion—PCT/US2013/054314—ISA/EPO—Jan. 2, 2014.
Budhia M., et al., "Development and Evaluation of Single Sided Flux Couplers for Contactless Electric Vehicle Charging", Energy Conversion Congress and Exposition (ECCE), IEEE, Sep. 2011, pp. 614-621, XP032067220.
Covic G.A., et al., "A Bipolar Primary Pad Topology for EV Stationary Charging and Highway Power by Inductive Coupling", Energy Conversion Congress and Exposition (ECCE), 2011 IEEE, IEEE, Sep. 17, 2011 (Sep. 17, 2011), pp. 1832-1838, XP032067402, DOI: 10.1109/ECCE.2011.6064008 ISBN: 978-1-4577-0542-7.

\* cited by examiner

APPARATUS SYSTEM, AND METHOD FOR WIRELESSLY RECEIVING POWER USING CONDUCTIVE STRUCTURES

CROSS REFERENCE TO RELATED APPLICATIONS

This application claims priority to and the benefit under 35 U.S.C. §119(e) of U.S. Provisional Patent Application No. 61/699,717 entitled "WIRELESS POWER TRANSFER SYSTEM COIL ARRANGEMENTS AND METHOD OF OPERATION" filed on Sep. 11, 2012, the disclosure of which is hereby incorporated by reference in its entirety. This application further claims priority to and the benefit under 35 U.S.C. §119(e) of U.S. Provisional Patent Application No. 61/699,700 entitled "DEVICE, SYSTEM AND METHOD FOR CONTROL OF WIRELESS POWER TRANSFER" filed on Sep. 11, 2012, the disclosure of which is hereby incorporated by reference in its entirety. This application further claims priority to and the benefit under 35 U.S.C. §119(e) of U.S. Provisional Patent Application No. 61/704,265 entitled "COIL ARRANGEMENTS IN WIRELESS POWER TRANSFER SYSTEMS" filed on Sep. 21, 2012, the disclosure of which is hereby incorporated by reference in its entirety.

FIELD

The present disclosure relates generally to wireless power transfer, and more specifically to devices, systems, and methods related to wireless power transfer to remote systems such as vehicles including batteries. More particularly, the present disclosure relates to coil arrangements for induction coils in a wireless power transfer system.

BACKGROUND

Remote systems, such as vehicles, have been introduced that include locomotion power derived from electricity received from an energy storage device such as a battery. For example, hybrid electric vehicles include on-board chargers that use power from vehicle braking and traditional motors to charge the vehicles. Vehicles that are solely electric generally receive the electricity for charging the batteries from other sources. Battery electric vehicles (electric vehicles) are often proposed to be charged through some type of wired alternating current (AC) such as household or commercial AC supply sources. The wired charging connections require cables or other similar connectors that are physically connected to a power supply. Cables and similar connectors may sometimes be inconvenient or cumbersome and have other drawbacks. Wireless charging systems that are capable of transferring power in free space (e.g., via a wireless field) to be used to charge electric vehicles may overcome some of the deficiencies of wired charging solutions. As such, wireless charging systems and methods that efficiently and safely transfer power for charging electric vehicles are desirable.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides an apparatus for wirelessly transmitting power. The apparatus includes a first conductive structure configured to generate a first magnetic field in response to receiving a first time-varying signal from a power source. The apparatus further includes a second conductive structure configured to generate a second magnetic field in response to receiving a second time-varying signal from the power source. The first and second structures are positioned to maintain a substantial absence of mutual coupling between the first and second magnetic fields.

Another aspect of the disclosure provides an implementation of a method of wirelessly transmitting power. The method includes generating a first magnetic field via a first conductive structure in response to receiving a first time-varying signal from a power source. The method further includes generating a second magnetic field via a second conductive structure in response to receiving a second time-varying signal from the power source. The first and second structures are positioned to maintain a substantial absence of mutual coupling between the first and second magnetic fields.

Yet another aspect of the disclosure provides an apparatus for wirelessly transmitting power. The apparatus includes a first means for generating a first magnetic field in response to receiving a first time-varying signal from a power source. The apparatus further includes a second means for generating a second magnetic field in response to receiving a second time-varying signal from the power source. The first and second generating means are positioned to maintain a substantial absence of mutual coupling between the first and second magnetic fields.

Another aspect of the subject matter described in the disclosure provides an apparatus for wirelessly transmitting power. The apparatus includes a first conductive structure configured to generate a first magnetic field based on a first current received from a power source. The apparatus further includes a second conductive structure configured to generate a second magnetic field based on a second current from the power source. The apparatus further includes a controller configured to determine a respective coupling coefficient between each of the first and second conductive structures and a third conductive structure configured to receive power via the first or the second magnetic field. The controller is further configured to adjust the first or second current applied to the first and second conductive structures based at least in part on the coupling coefficients.

Another aspect of the subject matter described in the disclosure provides an implementation of a method for wirelessly transmitting power. The method includes generating a first magnetic field via a first conductive structure based on a first current received from a power source. The method further includes generating a second magnetic field via a second conductive structure based on a second current from the power source. The method further includes determining a respective coupling coefficient between each of the first and second conductive structures and a third conductive structure configured to receive power via the first or the second magnetic field. The method further includes adjusting the first or second current applied to the first and second conductive structures based at least in part on the coupling coefficients.

Another aspect of the subject matter described in the disclosure provides an apparatus for wirelessly transmitting power. The apparatus includes a first means for generating a first magnetic field via based on a first current received from a power source. The apparatus further includes a second means for generating a second magnetic field based on a second current from the power source. The apparatus further includes means for determining a respective coupling coefficient between each of the first and second generating means and a means for receiving power via the first or the second magnetic field. The apparatus further includes means for adjusting the first or second current applied to the first and second generating means based at least in part on the coupling coefficients.

Another aspect of the subject matter described in the disclosure provides an apparatus for wirelessly receiving power. The apparatus includes a first conductive structure configured to wirelessly receive power via a magnetic field generated by a transmitter conductive structure having a length greater than a width. The first conductive structure has a length greater than a width. The first conductive structure includes a first loop and a second loop enclosing a first area and a second area, respectively. The first loop has a first lower surface and the second loop has a second lower surface that are substantially coplanar. The first conductive structure has a first edge and a second edge each intersecting a first geometric line running along the length of the first conductive structure. The apparatus further includes a second conductive structure configured to wirelessly receive power via the magnetic field. The second conductive structure encloses a third area and having a length greater than a width. The first geometric line runs along the length of the second conductive structure. The first geometric line is substantially perpendicular to a second geometric line running along the length of the transmitter conductive structure.

Another aspect of the disclosure provides an implementation of a method of wirelessly receiving power. The method includes wirelessly receiving power, at a first conductive structure, via a magnetic field generated by a transmitter conductive structure having a length greater than a width. The first conductive structure has a length greater than a width. The first conductive structure includes a first loop and a second loop enclosing a first area and a second area, respectively. The first loop has a first lower surface and the second loop has a second lower surface that are substantially coplanar. The first conductive structure has a first edge and a second edge each intersecting a first geometric line running along the length of the first conductive structure. The method further includes wirelessly receiving power, at a second conductive structure, via the magnetic field. The second conductive structure encloses a third area and has a length greater than a width. The first geometric line runs along the length of the second conductive structure. The first geometric line is substantially perpendicular to a second geometric line running along the length of the transmitter conductive structure.

Another aspect of the disclosure provides an apparatus for wirelessly receiving power. The apparatus includes a first means for wirelessly receiving power via a magnetic field generated by a transmitter conductive structure having a length greater than a width. The first receiving means has a length greater than a width. The first receiving means includes a first loop and a second loop enclosing a first area and a second area, respectively. The first loop has a first lower surface and the second loop has a second lower surface that are substantially coplanar. The first receiving means has a first edge and a second edge each intersecting a first geometric line running along the length of the first receiving means. The apparatus further includes a second means for wirelessly receiving power via the magnetic field, the second receiving means enclosing a third area and having a length greater than a width. The first geometric line runs along the length of the second receiving means. The first geometric line is substantially perpendicular to a second geometric line running along the length of the transmitter conductive structure.

Figure 1:
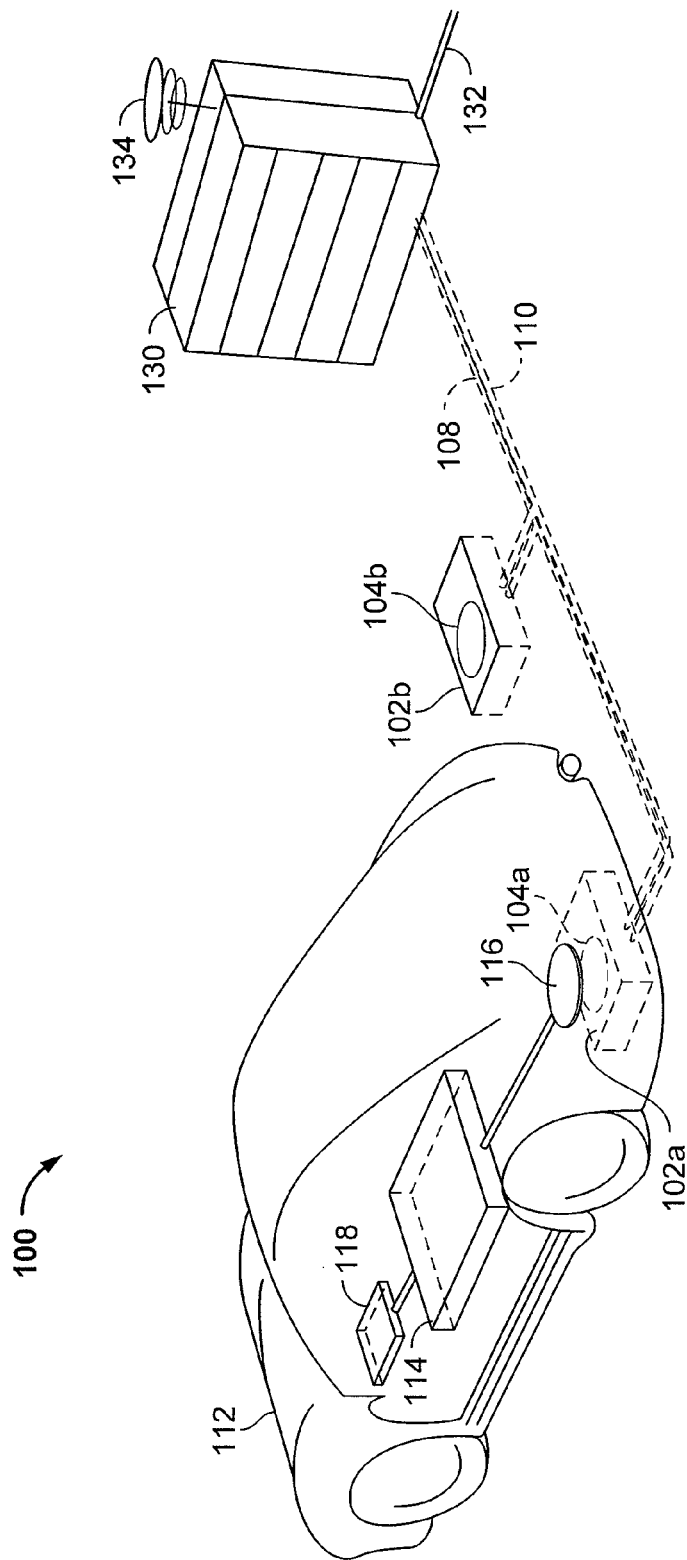
FIG. 1 is a diagram of an exemplary wireless power transfer system for charging an electric vehicle, in accordance with an exemplary embodiment.

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The detailed description set forth below in connection with the appended drawings is intended as a description of exemplary embodiments of the invention and is not intended to represent the only embodiments in which the invention may be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures and devices are shown in block diagram form in order to avoid obscuring the novelty of the exemplary embodiments presented herein.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field) may be received, captured by, or coupled by a "receiving coil" to achieve power transfer. It will be understood that, throughout this specification, two components being "coupled" may refer to their interaction through direct or indirect ways, and may further refer to a physically connected (e.g., wired) coupling or a physically disconnected (e.g., wireless) coupling.

An electric vehicle is used herein to describe a remote system, an example of which is a vehicle that includes, as part of its locomotion capabilities, electrical power derived from a chargeable energy storage device (e.g., one or more rechargeable electrochemical cells or other type of battery). As non-limiting examples, some electric vehicles may be hybrid electric vehicles that include besides electric motors, a traditional combustion engine for direct locomotion or to charge the vehicle's battery. Other electric vehicles may draw all locomotion ability from electrical power. An electric vehicle is not limited to an automobile and may include motorcycles, carts, scooters, and the like. By way of example and not limitation, a remote system is described herein in the form of an electric vehicle (EV). Furthermore, other remote systems that may be at least partially powered using a chargeable energy storage device are also contemplated (e.g., electronic devices such as personal computing devices and the like).

Inductive power transfer (IPT) systems are one way for the wireless transfer of energy. In IPT, a primary (or "transmitter") power device transmits power to a secondary (or "receiver") power receiver device. Each of the transmitter and receiver power devices include inductors, typically an arrangement of coils or windings of electric current conveying media. An alternating current in the primary inductor produces a fluctuating electromagnetic field. When the secondary inductor is placed in proximity to the primary inductor, the fluctuating electromagnetic field induces an electromotive force (EMF) in the secondary inductor, thereby transferring power to the secondary power receiver device.

In electric vehicle and plug-in hybrid vehicle IPT systems the primary power device may be situated on the ground and may be referred to as a "base" device or power pad. The secondary power device may be situated on the electric vehicle and may be referred to as a "pick-up" device or power pad. These devices are commonly used to transmit power from the base (transmitter) device to the pick-up (receiver) device. Some IPT systems are also able to function in a mode in which power is transferred the other way, i.e. from the pick-up device to the base device. In this mode, the pick-up device functions as the "primary" device and the base device functions as the "secondary" device because the pick-up induces an EMF in the base. This may allow power stored in an electric vehicle battery to be transferred back to a mains electricity grid.

PCT publication No. WO 2010/090539 discloses an IPT system for powering electric vehicles in which a base (usually the primary) coils include two separate co-planar coils positioned above a core formed from a material of high magnetic permeability, such as ferrite. In this arrangement, there is no straight path through the core that passes through the coils. The coils act as pole areas and lines of magnetic flux arc between them in the form of a "flux pipe" above the coils, a zone of high flux concentration. The arrangement is considered to result in little leakage of flux below the coils on the side of the core.

The same publication also discloses the use of three coils in the coil arrangement of the receiver (pick-up) device. The first two coils are separate co-planar coils as in the base coil arrangement. During charging, these two coils are aligned with the co-planar coils in the base device. The third coil is positioned centrally above the other two coils on the same side of the magnetically permeable core. The third coil allows power to be extracted from the vertical component of the magnetic field intercepted by the receiver device in addition to the horizontal component, which is extracted by the first two, co-planar coils. The co-planar coils are considered to have good tolerance to misalignment between the transmitter and receiver devices in the direction perpendicular to a line between the centers of the co-planar coils but less tolerance to misalignment in the direction parallel to the line between the centers of the co-planar coils. The three coil arrangement in the receiver device is considered to improve the tolerance of the IPT system in the parallel direction, thus increasing the overall tolerance of the system to misalignment in any direction.

PCT publication No. WO 2011/016737 describes an IPT system for powering electric vehicles in which a base coil arrangement includes two overlapping planar coils that are magnetically decoupled. Some coil arrangements increase complexity and cost and may include non-trivial mutual coupling between the induction coils In one aspect, it may be difficult to tailor to different types of IPT systems.

Thus, there remains a need for improved tolerance to IPT system coil misalignment, both in the longitudinal (i.e. forwards/backwards relative to the vehicle) direction and the transverse (i.e. side-to-side) direction.

In accordance with embodiments described herein, the IPT system may use resonant inductive coupling, in which power is transmitted between inductive coils that are tuned to resonate at substantially the same frequency. Resonant coupling may be achieved by adding inductive and/or capacitive elements in series or parallel with the induction coils or via selecting coils with a selected inherent capacitance (e.g., self-resonant).

In a resonant IPT system, the proportion of available power transferred to the pick-up is dependent on the degree of coupling between the primary and secondary coils. The greater the coupling, the more power is transferred to the secondary coil. The coupling coefficient may be defined as the fraction of flux of the primary coil that cuts the secondary coil, and is at least in part a function of the geometry of the system. The coupling coefficient is therefore at least in part dependent on the distance between the primary and secondary coils, and their alignment.

In wireless power transfer systems for charging electric vehicles using IPT, there can be large variations in the level of coupling each time a vehicle is charged. The distance and alignment between the primary and secondary coils may vary based on the location of the coils and the positioning of the vehicle, on which the pick-up is mounted, with respect to the base. This can create difficulties with regard to the demand on power electronic components in the system to compensate for this variation, resulting in the need for more expensive components, reducing reliability and limiting operating range.

FIG. 1 is a diagram of an exemplary wireless power transfer system 100 for charging an electric vehicle 112, in accordance with an exemplary embodiment. The wireless power transfer system 100 enables charging of an electric vehicle 112 while the electric vehicle 112 is parked near a base wireless charging system 102a. Spaces for two electric vehicles are illustrated in a parking area to be parked over corresponding base wireless charging system 102a and 102b. In some embodiments, a local distribution center 130 may be connected to a power backbone 132 and configured to provide an alternating current (AC) or a direct current (DC) supply through a power link 110 to the base wireless charging system 102a. The base wireless charging system 102a also includes a base system induction coil 104a for wirelessly transferring or receiving power. An electric vehicle 112 may include a battery unit 118, an electric vehicle induction coil 116, and an electric vehicle wireless charging system 114. The electric vehicle induction coil 116 may interact with the base system induction coil 104a for example, via a region of the electromagnetic field generated by the base system induction coil 104a.

In some exemplary embodiments, the electric vehicle induction coil 116 may receive power when the electric vehicle induction coil 116 is located in an energy field produced by the base system induction coil 104a. The field corresponds to a region where energy output by the base system induction coil 104a may be captured by an electric vehicle induction coil 116. In some cases, the field may correspond to the "near field" of the base system induction coil 104a. The near-field may correspond to a region in which there are strong reactive fields resulting from the currents and charges in the base system induction coil 104a that do not radiate power away from the base system induction coil 104a. In some cases the near-field may correspond to a region that is within about $1/2\pi$ of wavelength of the base system induction coil 104a (and vice versa for the electric vehicle induction coil 116) as will be further described below.

Local distribution 130 may be configured to communicate with external sources (e.g., a power grid) via a communication backhaul 134, and with the base wireless charging system 102a via a communication link 108.

In some embodiments the electric vehicle induction coil 116 may be aligned with the base system induction coil 104a and, therefore, disposed within a near-field region simply by the driver positioning the electric vehicle 112 correctly relative to the base system induction coil 104a. In other embodiments, the driver may be given visual feedback, auditory feedback, or combinations thereof to determine when the electric vehicle 112 is properly placed for wireless power transfer. In some embodiments, feedback may be generated by the wireless power transfer system 100, for example, electric vehicle 112 or a processor connected to a user interface of electric vehicle 112, or from a signal or sensor information that may be contained in the base wireless charging system 102a. In yet other embodiments, the electric vehicle 112 may be positioned by an autopilot system, which may move the electric vehicle 112 back and forth (e.g., in zig-zag movements) until an alignment error has reached a tolerable value. This may be performed automatically and autonomously by the electric vehicle 112 without or with only minimal driver intervention provided that the electric vehicle 112 is equipped with a servo steering wheel, ultrasonic sensors, and intelligence to adjust the vehicle. In still other embodiments, the electric vehicle induction coil 116, the base system induction coil 104a, or a combination thereof may have functionality for displacing and moving the induction coils 116 and 104a relative to each other to more accurately orient them and develop more efficient coupling therebetween.

The base wireless charging system 102a may be located in a variety of locations. As non-limiting examples, some suitable locations include a parking area at a home of the electric vehicle 112 owner, parking areas reserved for electric vehicle wireless charging modeled after conventional petroleum-based filling stations, and parking lots at other locations such as shopping centers and places of employment.

Charging electric vehicles wirelessly may provide numerous benefits. For example, charging may be performed automatically, virtually without driver intervention and manipulations thereby improving convenience to a user. There may also be no exposed electrical contacts and no mechanical wear out, thereby improving reliability of the wireless power transfer system 100. Manipulations with cables and connectors may not be needed, and there may be no cables, plugs, or sockets that may be exposed to moisture and water in an outdoor environment, thereby improving safety. There may also be no sockets, cables, and plugs visible or accessible, thereby reducing potential vandalism of power charging devices. Further, since an electric vehicle 112 may be used as distributed storage devices to stabilize a power grid, a docking-to-grid solution may be used to increase availability of vehicles for Vehicle-to-Grid (V2G) operation.

A wireless power transfer system 100 as described with reference to FIG. 1 may also provide aesthetical and non-impedimental advantages. For example, there may be no charge columns and cables that may be impedimental for vehicles and/or pedestrians.

As a further explanation of the vehicle-to-grid capability, the wireless power transmit and receive capabilities may be configured to be reciprocal such that the base wireless charging system 102a transfers power to the electric vehicle 112 and the electric vehicle 112 transfers power to the base wireless charging system 102a e.g., in times of energy shortfall. This capability may be useful to stabilize the power distribution grid by allowing electric vehicles to contribute power to the overall distribution system in times of energy shortfall caused by over demand or shortfall in renewable energy production (e.g., wind or solar).

It will be therefore understood that the terms "transmitter," "receiver," "primary," and "secondary" and the like are used herein to refer to the uses of the components of the wireless power transfer system when used for transferring power from the power supply to the electric vehicle, i.e. from the transmitter or primary device to the receiver or secondary device. However, the wireless power transfer system may involve the use of these components to transfer some power, which in some embodiments may only be a small amount, in the opposite direction, for example to transfer energy from the electric vehicle to the power distribution grid, as part of a process to improve alignment of the transmitter and receiver devices, or to identify which transmitter device is appropriately placed for transferring power to the receiver device. Therefore the "transmitter" may also be used to receive power and the "receiver" may also be used to transmit power. The use of these terms, although referring to the normal sense of operation of certain components of the system for ease of understanding, does not limit embodiments to any particular operation of such components.

Figure 2:
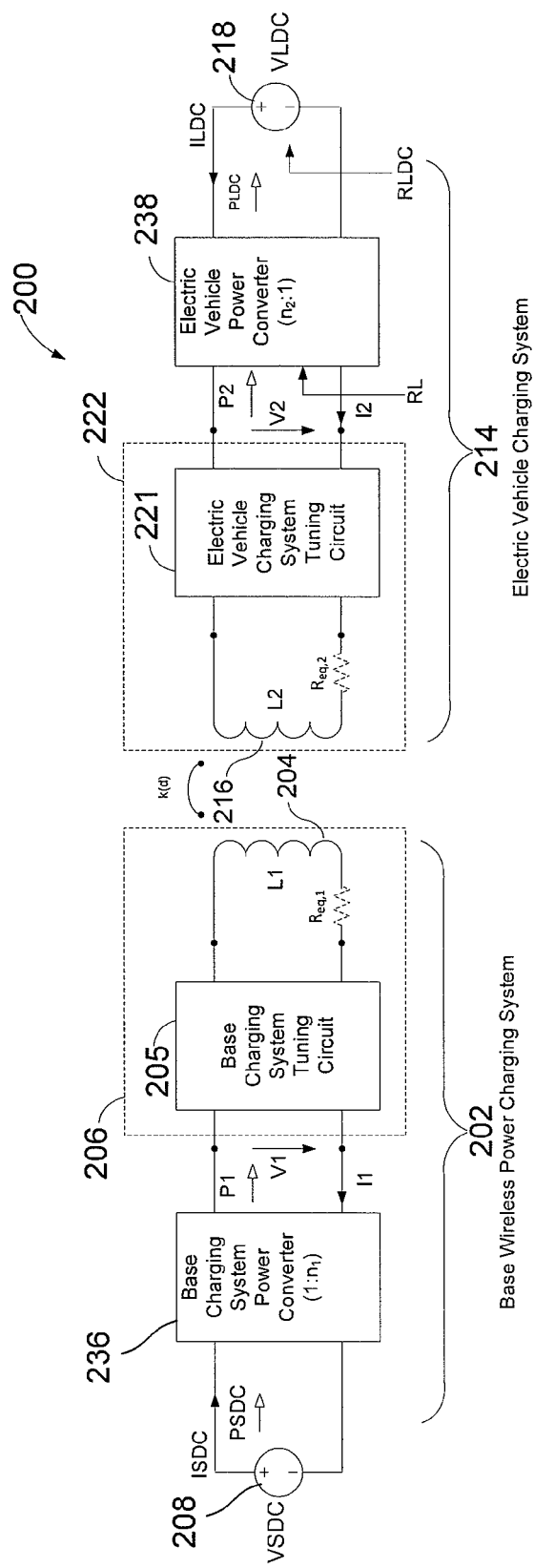
FIG. 2 is a schematic diagram of exemplary components of the wireless power transfer system of FIG. 1.

FIG. 2 is a schematic diagram of exemplary components of the wireless power transfer system 100 of FIG. 1. As shown in FIG. 2, the wireless power transfer system 200 may include a base system transmit circuit 206 including a base system induction coil 204 having an inductance $L_1$. The wireless power transfer system 200 further includes an electric vehicle receive circuit 222 including an electric vehicle induction coil 216 having an inductance $L_2$. Embodiments described herein may use capacitively loaded wire loops (i.e., multi-turn coils) forming a resonant structure that is capable of efficiently coupling energy from a primary structure (transmitter) to a secondary structure (receiver) via a magnetic or electromagnetic near field if both primary and secondary are tuned to a common resonant frequency.

A resonant frequency may be based on the inductance and capacitance of a transmit circuit including an induction coil (e.g., the base system induction coil 204) as described above. As shown in FIG. 2, inductance may generally be the inductance of the induction coil, whereas capacitance may be added to the induction coil to create a resonant structure at a desired resonant frequency. As a non-limiting example, a capacitor may be added or may be integrated with the induction coil, and arranged to be in series with the induction coil to create a resonant circuit (e.g., the base system transmit circuit 206) that generates an electromagnetic field. Accordingly, for larger diameter induction coils, the value of capacitance for inducing resonance may decrease as the diameter or inductance of the coil increases. Inductance may also depend on a number of turns of an induction coil. Furthermore, as the diameter of the induction coil increases, the efficient energy transfer area of the near field may increase. Other resonant circuits are possible. As another non limiting example, a capacitor may be placed in parallel between the two terminals of the induction coil (e.g., a parallel resonant circuit). Furthermore an induction coil may be designed to have a high quality (Q) factor to improve the resonance of the induction coil.

Coils adapted for use in resonant structures may be used for the electric vehicle induction coil 216 and the base system induction coil 204. Using resonant structures for coupling energy may be referred to "magnetic coupled resonance," "electromagnetic coupled resonance," and/or "resonant induction." The operation of the wireless power transfer system 200 will be described based on power transfer from a base wireless power charging system 202 to an electric vehicle 112, but is not limited thereto. For example, as discussed above, the electric vehicle 112 may transfer power to the base wireless charging system 102a.

With reference to FIG. 2, a power supply 208 (e.g., AC or DC) supplies power $P_{SDC}$ to the base wireless power charging system 202 to transfer energy to an electric vehicle 112. The base wireless power charging system 202 includes a base charging system power converter 236. The base charging system power converter 236 may include circuitry such as an AC/DC converter configured to convert power from standard mains AC to DC power at a suitable voltage level, and a DC/low frequency (LF) converter configured to convert DC power to power at an operating frequency suitable for wireless high power transfer. The base charging system power converter 236 supplies power $P_1$ to the base system transmit circuit 206 including a base charging system tuning circuit 205 which may consist of reactive tuning components in a series or parallel configuration or a combination of both with the base system induction coil 204 to emit an electromagnetic field at a desired frequency. The capacitor $C_1$ (not shown) may be provided to form a resonant circuit with the base system induction coil 204 that resonates at a desired frequency. The base system induction coil 204 receives the power $P_1$ and wirelessly transmits power at a level sufficient to charge or power the electric vehicle 112. For example, the power level provided wirelessly by the base system induction coil 204 may be on the order of kilowatts (kW) (e.g., anywhere from 1 kW to 110 kW or higher or lower).

Both the base system transmit circuit 206, which includes the base system induction coil 204, and the electric vehicle receive circuit 222, which includes the electric vehicle induction coil 216, may be tuned to substantially the same frequencies and may be positioned within the near-field of an electromagnetic field transmitted by one of the base system induction coil 204 and the electric vehicle induction coil 116. In this case, the base system induction coil 204 and electric vehicle induction coil 116 may become coupled to one another such that power may be transferred to the electric vehicle receive circuit 222 including an electric vehicle charging system tuning circuit 221 and electric vehicle induction coil 216. The electric vehicle charging system tuning circuit 221 may be provided to form a resonant circuit with the electric vehicle induction coil 216 that resonates at a desired frequency. The mutual coupling coefficient resulting at coil separation is represented by element k(d). Equivalent resistances $R_{eq,1}$ and $R_{eq,2}$ represent the losses that may be inherent to the induction coils 204 and 216 and any anti-reactance capacitors that may, in some embodiments, be provided in the base charging system tuning circuit 205 and electric vehicle charging system tuning circuit 221 respectively. The electric vehicle receive circuit 222 including the electric vehicle induction coil 216 and electric vehicle charging system tuning circuit 221 receives power $P_2$ and provides the power $P_2$ to an electric vehicle power converter 238 of an electric vehicle charging system 214.

The electric vehicle power converter 238 may include, among other things, a LF/DC converter configured to convert power at an operating frequency back to DC power at a voltage level matched to the voltage level of an electric vehicle battery unit 218. The electric vehicle power converter 238 may provide the converted power $P_{LDC}$ to charge the electric vehicle battery unit 218. The power supply 208, base charging system power converter 236, and base system induction coil 204 may be stationary and located at a variety of locations as discussed above. The battery unit 218, electric vehicle power converter 238, and electric vehicle induction coil 216 may be included in an electric vehicle charging system 214 that is part of electric vehicle 112 or part of the battery pack (not shown). The electric vehicle charging system 214 may also be configured to provide power wirelessly through the electric vehicle induction coil 216 to the base wireless power charging system 202 to feed power back to the grid. Each of the electric vehicle induction coil 216 and the base system induction coil 204 may act as transmit or receive induction coils based on the mode of operation.

While not shown, the wireless power transfer system 200 may include a load disconnect unit (LDU) to safely disconnect the electric vehicle battery unit 218 or the power supply 208 from the wireless power transfer system 200. For example, in case of an emergency or system failure, the LDU may be triggered to disconnect the load from the wireless power transfer system 200. The LDU may be provided in addition to a battery management system for managing charging to a battery, or it may be part of the battery management system.

Further, the electric vehicle charging system 214 may include switching circuitry (not shown) for selectively connecting and disconnecting the electric vehicle induction coil 216 to the electric vehicle power converter 238. Disconnecting the electric vehicle induction coil 216 may suspend charging and also may adjust the "load" as "seen" by the base wireless charging system 102a (acting as a transmitter), which may be used to decouple the electric vehicle charging system 114 (acting as the receiver) from the base wireless charging system 102a. The load changes may be detected if the transmitter includes the load sensing circuit. Accordingly, the transmitter, such as a base wireless charging system 202, may have a mechanism for determining when receivers, such as an electric vehicle charging system 114, are present in the near-field of the base system induction coil 204.

As described above, in operation, assuming energy transfer towards the vehicle or battery, input power is provided from the power supply 208 such that the base system induction coil 204 generates a field for providing the energy transfer. The electric vehicle induction coil 216 couples to the radiated field and generates output power for storage or consumption by the electric vehicle 112. As described above, in some embodiments, the base system induction coil 204 and electric vehicle induction coil 116 are configured according to a mutual resonant relationship such that when the resonant frequency of the electric vehicle induction coil 116 and the resonant frequency of the base system induction coil 204 are very close or substantially the same, energy is transferred highly efficiently. Transmission losses between the base wireless power charging system 202 and electric vehicle charging system 214 are minimal when the electric vehicle induction coil 216 is located in the near-field of the base system induction coil 204.

As stated, an efficient energy transfer occurs by coupling a large portion of the energy in the near field of a transmitting induction coil to a receiving induction coil rather than propagating most of the energy in an electromagnetic wave to the far-field. When in the near field, a coupling mode may be established between the transmit induction coil and the receive induction coil. The area around the induction coils where this near field coupling may occur is referred to herein as a near field coupling mode region.

While not shown, the base charging system power converter 236 and the electric vehicle power converter 238 may both include an oscillator, a driver circuit such as a power amplifier, a filter, and a matching circuit for efficient coupling with the wireless power induction coil. The oscillator may be configured to generate a desired frequency, which may be adjusted in response to an adjustment signal. The oscillator signal may be amplified by a power amplifier with an amplification amount responsive to control signals. The filter and matching circuit may be included to filter out harmonics or other unwanted frequencies and match the impedance of the power conversion module to the wireless power induction coil. The power converters 236 and 238 may also include a rectifier and switching circuitry to generate a suitable power output to charge the battery.

The electric vehicle induction coil 216 and base system induction coil 204 as described throughout the disclosed embodiments may be referred to or configured as "loop" antennas, and more specifically, multi-turn loop antennas. The induction coils 204 and 216 may also be referred to herein or be configured as "magnetic" antennas. The coil may also be referred to as an "antenna" of a type that is configured to wirelessly output or receive power. As used herein, coils 204 and 216 are examples of "power transfer components" of a type that are configured to wirelessly output, wirelessly receive, and/or wirelessly relay power. Loop (e.g., multi-turn loop) antennas may be configured to include an air core or a physical core such as a ferrite core. An air core loop antenna may allow the placement of other components within the core area. Physical core antennas including ferromagnetic or ferrimagnetic materials may allow development of a stronger electromagnetic field and improved coupling.

In this specification the term "coil" is used in the sense of a localized winding arrangement having a number of turns of electrically conducting material that all wind around one or more central points. The term "coil arrangement" is used to mean any winding arrangement of conducting material, which may comprise a number of "coils."

As discussed above, efficient transfer of energy between a transmitter and receiver occurs during matched or nearly matched resonance between a transmitter and a receiver. However, even when resonance between a transmitter and receiver are not matched, energy may be transferred at a lower efficiency. Transfer of energy occurs by coupling energy from the near field of the transmitting induction coil to the receiving induction coil residing within a region (e.g., within a predetermined frequency range of the resonant frequency, or within a predetermined distance of the near-field region) where this near field is established rather than propagating the energy from the transmitting induction coil into free space.

As described above, according to some embodiments, coupling power between two induction coils that are in the near field of one another is disclosed. As described above, the near field may correspond to a region around the induction coil in which electromagnetic fields exist. Near-field coupling-mode regions may correspond to a volume that is near the physical volume of the induction coil, typically within a small fraction of the wavelength. According to some embodiments, electromagnetic induction coils, such as single and multi-turn loop antennas, are used for both transmitting and receiving since magnetic near field amplitudes in practical embodiments tend to be higher for magnetic type coils in comparison to the electric near fields of an electric type antenna (e.g., a small dipole). This allows for potentially higher coupling between the pair. Furthermore, "electric" antennas (e.g., dipoles and monopoles) or a combination of magnetic and electric antennas may be used.

Figure 3:
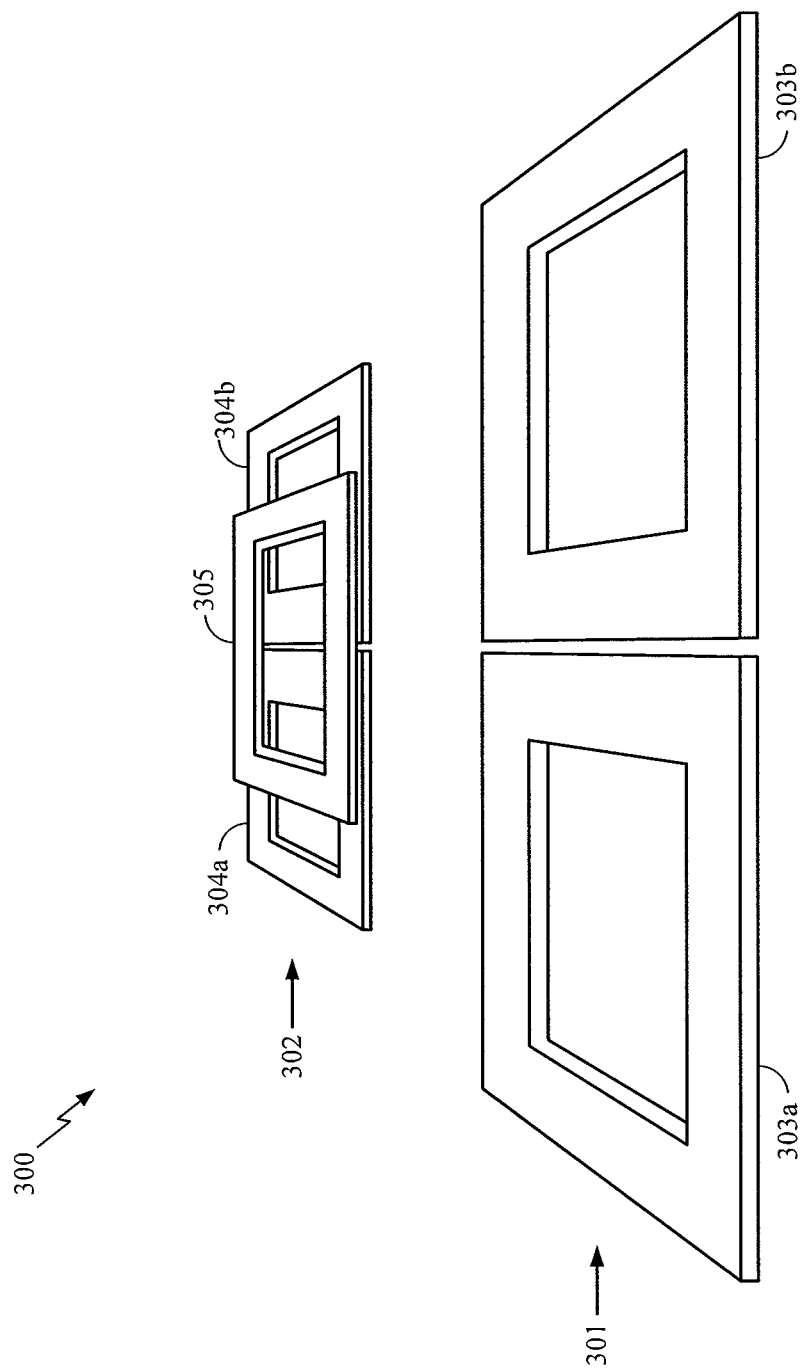
FIG. 3 is a perspective view illustration of exemplary induction coils used in an electric vehicle wireless power transfer system.

FIG. 3 is a perspective view illustration of induction coils used in an electric vehicle wireless power transfer system 300. The wireless power transfer system comprises base or transmitter wireless power transfer device which includes transmitter coil arrangement 301 and a pick-up or receiver wireless power transfer device which includes receiver coil arrangement 302. Only the coils of the system 300 are shown in FIG. 3 for clarity purposes. The system 300 may include one or more additional components as described, for example, with reference to FIGS. 1 and 2, and as otherwise described herein. The transmitter coils 301 may, for example, form part of a wireless power transmitter apparatus situated on the ground in a vehicle parking space while the receiver coils 302 may, for example, form part of a wireless power receiver device located on the underside of an electric vehicle. For the purposes of this specification, it may be assumed that the coils in FIG. 3 and all diagrams of a similar nature as described below are viewed in the longitudinal direction of the electric vehicle. FIG. 3 shows receiver coils 302 positioned over transmitter coils 301, a position suitable for wireless power transfer between the transmitter and receiver coils 301 and 302 upon energizing the transmitter coils 301.

In the configuration of FIG. 3, transmitter coils 301 comprise two substantially co-planar transmitter coils 303a and 303b connected to one or more power sources (not shown). In an embodiment, electric current flows in the same direction in the adjacent portions of the two coils 303a and 303b and the current in these adjacent portions has substantially the same magnitude and phase.

Receiver coils 302 comprise two substantially co-planar receiver coils 304a and 304b and a third coil 305 positioned over the co-planar receiver coils 304a and 304b. The coils in coil arrangement 302 may be connected to a battery of the electric vehicle.

Both transmitter and receiver coil arrangements 301 and 302 are associated with magnetically permeable members such as ferrite cores (not shown) positioned under the transmitter coils 301 and above the receiver coils 302. To transfer power using the coils 301 and 302 of FIG. 3, an alternating electric current is passed through the transmitter coils 301. This creates a magnetic field in the form of a "flux pipe," a zone of high flux concentration, looping above coil arrangement 301 between the holes in transmitter coils 303a and 303b. In use, receiver coils 302 are positioned such that the receiver coils 304 and 305 intersect the lines of magnetic flux, thus inducing electric current in the receiver coils 304 and 305, which is supplied to the battery of the electric vehicle.

The co-planar receiver coils 304a and 304b extract power from the horizontal components of magnetic flux generated by the transmitter coils 301. The single receiver coil 305 extracts power from the vertical component of the magnetic flux generated by the transmitter coils. Thus, in combination, the coils of receiver coils 302 enable energy transfer between the transmitter and receiver devices of the wireless power transfer system. The operation and configuration as described with reference to FIG. 3 may analogously apply, where applicable, to the further embodiments described herein.

Figure 4:
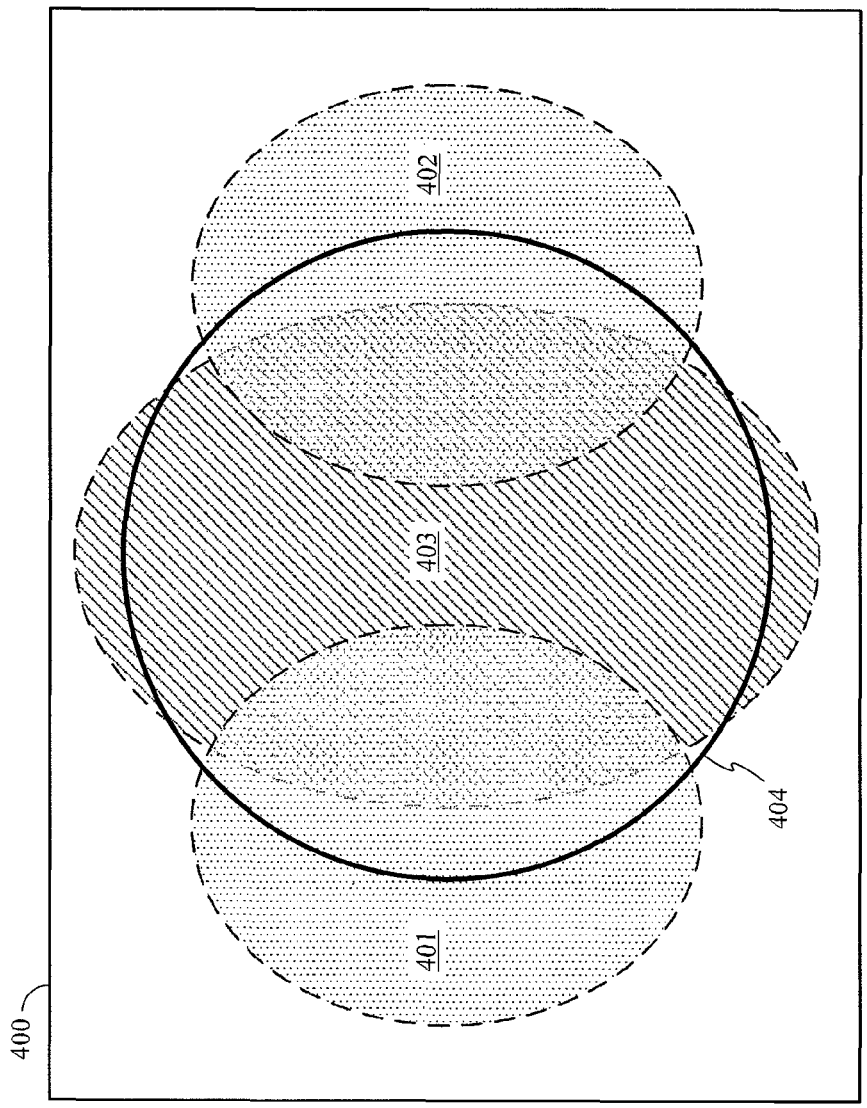
FIG. 4 is a diagram illustrative of the spatial distribution of power contributions of the coils shown in FIG. 3 during wireless power transfer.

FIG. 4 is a diagram illustrative of the spatial distribution of power contributions of the coils shown in FIG. 3 during wireless power transfer. FIG. 4 depicts, in plan view, an area 400 covered by the coils 300 of FIG. 3. The areas outlined in a broken line indicate approximate areas of power contribution from the transmitter coils 303a and 303b of transmitter coils 301 as shown in FIG. 3. The diagonally shaded area indicates the approximate spatial distribution of power supplied to the co-planar receiver coils 304a and 304b while the dotted shaded area indicates the approximate spatial distribution of power supplied to the single receiver coil 305. Thus, areas 401 and 402 represent the approximate spatial distribution of power supplied to the single receiver coil 305 from the transmitter coils 303a and 303b, while area 403 represents the approximate spatial distribution of power supplied to the co-planar receiver coils 304a and 304b from the transmitter coils 303a and 303b. It is noted that the spatial distribution of power contributions may vary continuously across the area of the coils. The areas shown in FIG. 4 and similar such diagrams elsewhere in this specification represent approximate areas of highest power contribution, for example the areas of power contribution above a certain threshold.

Line 404 shown in bold in FIG. 4 represents an estimated region of tolerance for the coil arrangements 300 shown in FIG. 3. That is, line 404 marks the approximate area over which the centers of coil arrangements 301 and 302 may be misaligned before the amount of power transfer between the coils falls below a certain level. It will be understood that line 404 is merely indicative of the tolerance region resulting from the spatial power distributions of the coils of wireless power transfer system 300, it is exemplary and shown to illustrate relative spatial power distribution of the coils of the system 300. Likewise, the tolerance regions for further embodiments described herein are exemplary and are shown to illustrate relative spatial distribution of the coils, for example, as compared to other embodiments described herein.

The coil arrangement shown in FIG. 3 can be seen to have an approximately circular tolerance region 404 in FIG. 4, meaning the degree of misalignment between the transmitter and receiver coil arrangements that the system can withstand while still transferring power reasonably efficiently is roughly equal in the longitudinal and transverse directions.

As mentioned previously, it may be desirable for an electric vehicle IPT system to have flexibility in tolerance to suit the requirements of a particular situation. For example, when an electric vehicle is manually maneuvered into position for charging, research has shown that human drivers are better at judging vehicle alignment in the transverse direction than in the longitudinal direction. Therefore a human driver is more likely to position a vehicle correctly transversely than longitudinally. This might imply greater tolerance to misalignment in the longitudinal direction would be desirable for a manually positioned vehicle.

On the other hand, in some situations, it may be beneficial to have a greater degree of tolerance to misalignment in the transverse direction. It is relatively easier to adjust the position of a vehicle longitudinally simply by moving the vehicle backwards or forwards but transverse re-alignment is more difficult and time consuming because it requires a re-parking maneuver. This applies when a vehicle is positioned for charging by an automatic control system or manually.

In addition, there may be regulatory issues with vehicles being controlled entirely automatically, even when parking the vehicle over an IPT base device. Some systems allow the vehicle to control steering but require the driver to manually control the accelerator and brake. In such systems, greater alignment tolerance may be required in the longitudinal direction, since the driver may be expected to be able to align a vehicle less well than an automatic system in this direction.

Another consideration is that, due to regulations set by the International Commission on Non-Ionizing Radiation Protection (ICNIRP), it may be desirable to reduce the magnetic field emissions from the transmitter device that may leak out beyond the boundaries of the vehicle, for example from the side of the vehicle, into areas where people may be exposed to those emissions. These emissions may be particularly present when a receiver device is misaligned. There may be an exponential increase of field emissions the closer the transmitter device is aligned to the side of the vehicle. In order to minimize emissions, it is therefore desirable to optimize the transverse alignment of the transmitter and receiver devices on an electric vehicle.

As such, the approximate tolerance region 404 for the coil arrangement shown in FIG. 3 may not be suitable for the alignment tolerance requirements of electric vehicles in some situations.

In addition, the coil arrangement 302 on the electric vehicle side of the wireless power transfer system comprises three individual coils of electrically conducting material. This number of coils adds may add cost to the manufacture of the electric vehicle on which the coil arrangement 302 is mounted in some situations. The electronics required to operate and control this coil arrangement is also complex, adding further cost to the manufacture of the electric vehicle. The size and complexity of coil arrangement 302 may also add weight to the electric vehicle, increasing running costs in certain scenarios.

Figure 5:
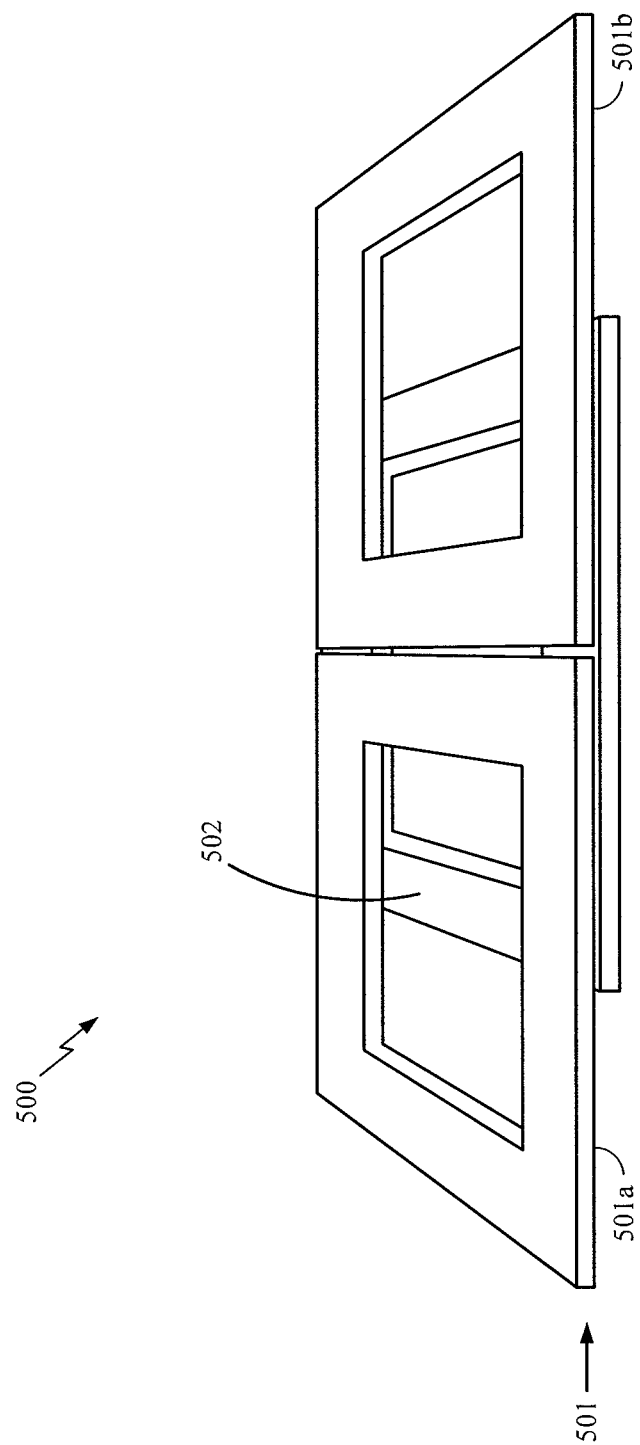
FIG. 5 is a perspective view illustration of induction coils of a wireless power transmitter apparatus according to an exemplary embodiment.

FIG. 5 is a perspective view illustration of induction coils 500 of a wireless power transmitter apparatus according to an embodiment. In use, the wireless power transfer transmitter device including transmitter coils 500 may be positioned on a ground surface, for example in a car park, garage, charging station or the like.

Transmitter coils 500 comprises a first coil structure 501 and a second coil structure 502. The second coil structure 502 is positioned substantially centrally adjacent to the first coil structure 501, for example under the first coil structure 501. In another embodiment, the second coil arrangement may be positioned over the first coil structure.

In the embodiment shown in FIG. 5, first coil structure 501 comprises two substantially co-planar transmitter coils 501a and 501b positioned adjacent to one another. Stated another way the first coil structure 501 comprises first and second loops enclosing first and second areas, respectively. The first and second loops have lower surfaces that are substantially coplanar. In some embodiments the first coil structure 501 is formed from a single coil (e.g., that may have one or more turns) that is wound to enclose the first and second areas. In other embodiments, two separate coils 501a and 501b may be used. In use, the co-planar transmitter coils 501a and 501b may be able to be connected to one or more electric power sources such that current flows clockwise around one coil and counterclockwise around the other coil, i.e. such that electric current flows in the same direction in the adjacent portions of the two coils 501a and 501b. The co-planar transmitter coils 501a and 501b may be connected in series or parallel to the same power source or alternatively they may be connected to a common power source such that the current in the adjacent portions of the coils has substantially the same magnitude and phase.

The second coil structure 502 comprises a single planar transmitter coil 502 in the embodiment shown in FIG. 5. Planar transmitter coil 502 is positioned centrally under first coil arrangement 501 such that the hole in planar transmitter coil 502 is aligned with a point between the two coils 501a and 501b. Stated another way, the second transmitter coil 502 encloses a third area and according to some embodiments may be positioned such that substantially a center of the third area is positioned substantially over a point between the two coils 501a and 501b.

Furthermore, the end portions of transmitter coil 502 may generally be adjacent to spaces in respective interiors of co-planar transmitter coils 501a and 501b.

The overall transmitter coil arrangement 500 has a length along its longitudinal axis, which is aligned with a line between the centers of the two coils 501a and 501b, that is greater than its width along a transverse axis, which is perpendicular to the longitudinal axis. Stated another way, the first and second coil structures 501 and 502 have lengths longer than their widths. A geometric line running along the width of the first coil structure and between coils 501a and 501b is perpendicular to a geometric line running along the length.

In use, planar transmitter coil 502 is also connectable to an electric power source.

The first and second coil structures 501 and 502 are configured such that, when powered, there is no mutual coupling between the magnetic fields generated by each coil structure 501 and 502. For example, in the embodiment shown in FIG. 5, there is no mutual coupling between the coil structures 501 and 502 as a result of the geometry of the configuration. The magnetic fields generated by the two coil structures add and subtract from each other in different places over the area of the coil structures 500, but the addition and subtraction is in equal parts such that there is no mutual coupling. In other words, the sum of the magnetic field produced by the first coil arrangement that intersects the second coil arrangement is substantially zero. In this way there is a substantial absence of mutual coupling between the coil structure 501 and the coil structure 502. Stated another way, when a current (e.g., a time-varying signal) is applied to first coil structure 501, substantially zero voltage is generated in the second coil structure 502 as a result of the current applied to the first coil structure 501. Likewise, when a current (e.g., a time-varying signal) is applied to the second coil structure 502, substantially zero voltage is generated in the first coil structure 501 as a result of the current applied to the second coil structure 501. The first coil structure 501 may have a substantially horizontally polarized magnetic moment and the second coil structure 402 may have a substantially vertically polarized magnetic moment.

Figure 6:
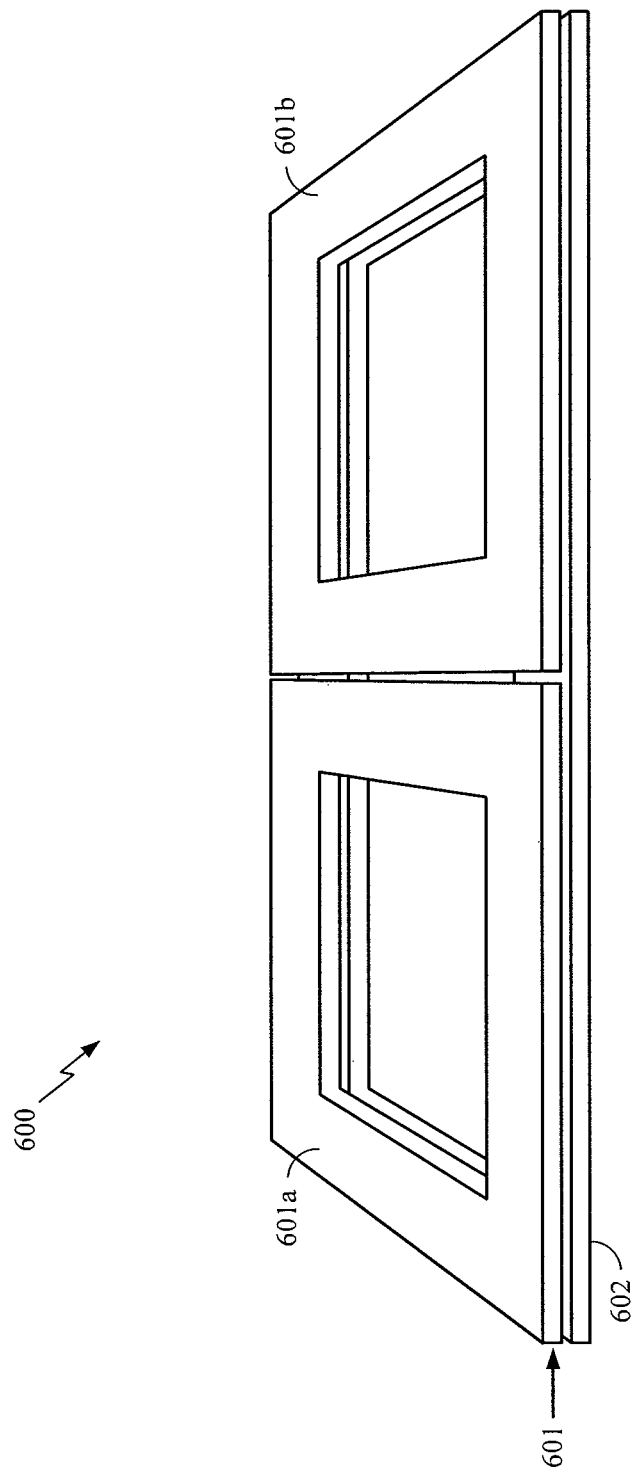
FIG. 6 is a perspective view illustration of induction coils of a wireless power transmitter apparatus according to another exemplary embodiment.

FIG. 6 is a perspective view illustration of induction coils 600 of a wireless power transmitter apparatus according to another embodiment. Coil arrangement 600 is similar to coil arrangement 500 shown in FIG. 5 and comprises a first coil structure 601 which itself comprises co-planar transmitter coils 601a and 601b, and a second coil structure 602 comprising a single planar transmitter coil 602. One difference between coil arrangement 600 and coil arrangement 500 is the size of the planar transmitter coil 602. In the embodiment shown in FIG. 6, transmitter coil 602 covers an area similar to the area covered by the first coil structure 601. That is, the outermost lengths of conducting material in each coil arrangement 601 and 602 are generally aligned.

A further embodiment comprises a first coil structure comprising a single coil and a second coil structure also comprising a single coil. Again, the second coil arrangement is positioned centrally under the first coil arrangement such that there is no mutual coupling between the magnetic fields generated by the coils. This embodiment may be more difficult to control and lead to smaller tolerance regions than, for example, the embodiments shown in FIG. 5 and FIG. 6.

Coil arrangements 500 or 600 may be used in a wireless power transmitter apparatus in an electric vehicle wireless power transfer system. While not shown in FIG. 5 or FIG. 6, wireless power transmitter apparatuses according to various embodiments (e.g., comprising one or more components of FIG. 1 or 2 or otherwise described herein) may each comprise one or more magnetically permeable members magnetically associated with the coil arrangements 500 or 600. For example, ferrite cores (not shown) may be positioned below the coil arrangements 500 or 600. Magnetic shielding may also be used to contain the magnetic fields in the power transfer region and reduce energy losses. Such a system may use resonant inductive coupling between the transmitter and receiver devices. Coil structures 501 and 502 may be tuned separately to each other to achieve the resonant frequency. The tuning of the coil structures 501 and 502 in the transmitter device may also take into account the influence of coils of a receiver device and their tuning, particularly for closely coupled systems. For example, parallel-tuned receiver coils may reduce the inductance of the transmitter coils so the tuning of the transmitter coils may be performed when the receiver coils are present and short circuited.

Wireless power transmitter apparatuses according to various embodiments as just described, for example with reference to FIGS. 5 and 6, provide a number of benefits. Including both a co-planar coil structure 501 and a single coil 502 on the transmitter side of an electric vehicle IPT system allows for fewer components that may be required on the electric vehicle in a receiver structure as compared to some systems without adversely affecting power transfer rates or efficiency. This allows for reduced complexity and cost of electric vehicles. In addition, since the single coil 502 supplies flux in the vertical direction while the co-planar coils 501 supply flux in the horizontal direction, the transmitter device can be tailored to produce magnetic flux field that is tailored to the type or position of electric vehicle receiver device by changing the magnitude and phase of the current in the co-planar and single coils 501 and 502. Adjustment of the magnitude and phase of the currents in each coil may be done simultaneously. Having two coil arrangements providing power to the receiver coil also allows for the rate and/or efficiency of wireless power transfer to be increased. Furthermore, the coils in the transmitter device can be configured to provide different degrees of tolerance to misalignment, which may suit different system requirements.

These and other benefits will now be discussed in relation to several exemplary embodiments of electric vehicle IPT systems incorporating wireless power transmitter apparatuses.

Figure 7:
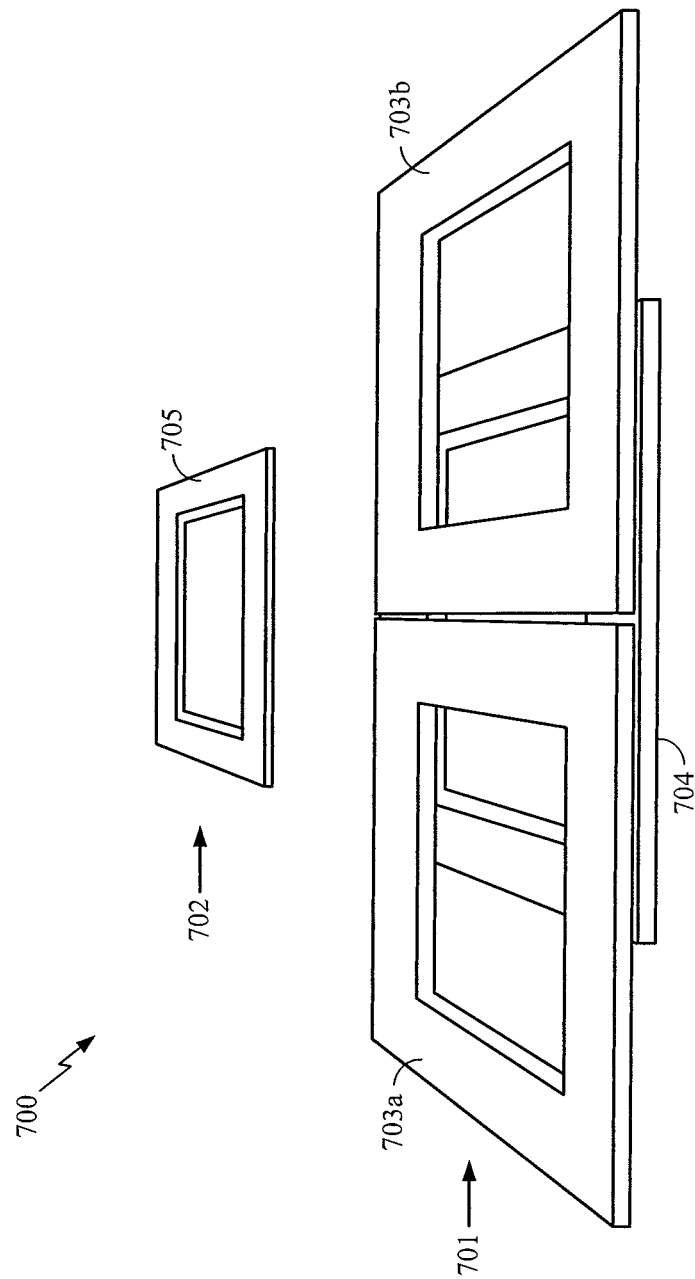
FIG. 7 is a perspective view illustration of induction coils in a wireless power transfer system according to an exemplary embodiment.

FIG. 7 is a perspective view illustration of induction coils 701 and 702 in a wireless power transfer system 700 according to an exemplary embodiment. The coils 701 and 702 illustrated in FIG. 7 may be used in an electric vehicle wireless power transfer system, for example. The wireless power transfer system 700 comprises a wireless power transmitter apparatus (of which only a portion of the coils is shown), which itself comprises a first coil structure 701 and a second coil structure 704, and a wireless power transfer receiver device, which itself comprises a receiver coil structure 702. Transmitter coil structures 701 and 704 may be the same as coil structures 501 and 502 of FIG. 5, respectively. Receiver coil structure 702 comprises a planar receiver coil 705 that is configured to electrically connect to a load, for example wired connection to an electric vehicle battery. The coils are shown in FIG. 7 in typical positions in an electric vehicle charging situation, with the receiver coil 705 positioned over the transmitter coil structures 701 and 704. In the position shown in FIG. 7, the wireless power transmitter and receiver coils 701 and 702 may be considered well aligned since the centers of the transmitter and receiver coil arrangements 701 and 702 are in vertical alignment. In other embodiments, good alignment may be considered to be a different arrangement of the coil arrangements, depending on the layout and geometry of the coil arrangements.

Compared to the coil arrangements of FIG. 3, the coil arrangements of the embodiment shown in FIG. 7 provide advantages for wireless power transfer systems. For example, the receiver coil arrangement 702, typically mounted on an electric vehicle, is relatively simple, comprising a single planar coil 705. This reduces the cost and complexity of the IPT components on the electric vehicle. While there may be more complexity on the transmitter side of the system as a result, for example arising from the need to control the currents in the transmitter coils 703a, 703b, and 704, this may be acceptable in some situations in view of the advantages on the receiver side of the system.

In addition, the use of multiple coils in the transmitter device as shown in FIG. 7, and in transmitter devices according to embodiments discussed herein, allows the currents in the transmitter coil arrangements to be controlled to increase power transfer efficiency. When both transmitter coil structures 703a-b and 704 are coupled to the receiver coil structure 702, the magnitude of current in the transmitter coils 703a, 703b and 704 can be adjusted to increase efficiency for a given output power. For example, if the coupling from transmitter coil structure 703a and 703b and transmitter coil structure 704 is equal, high efficiency can be achieved by running equal currents through the two transmitter coil arrangements to reduce resistive losses. However, if one of the transmitter coil arrangements 703a-b or 704 has a very low coupling it may be more efficient to zero the current in that coil arrangement.

Figure 8:
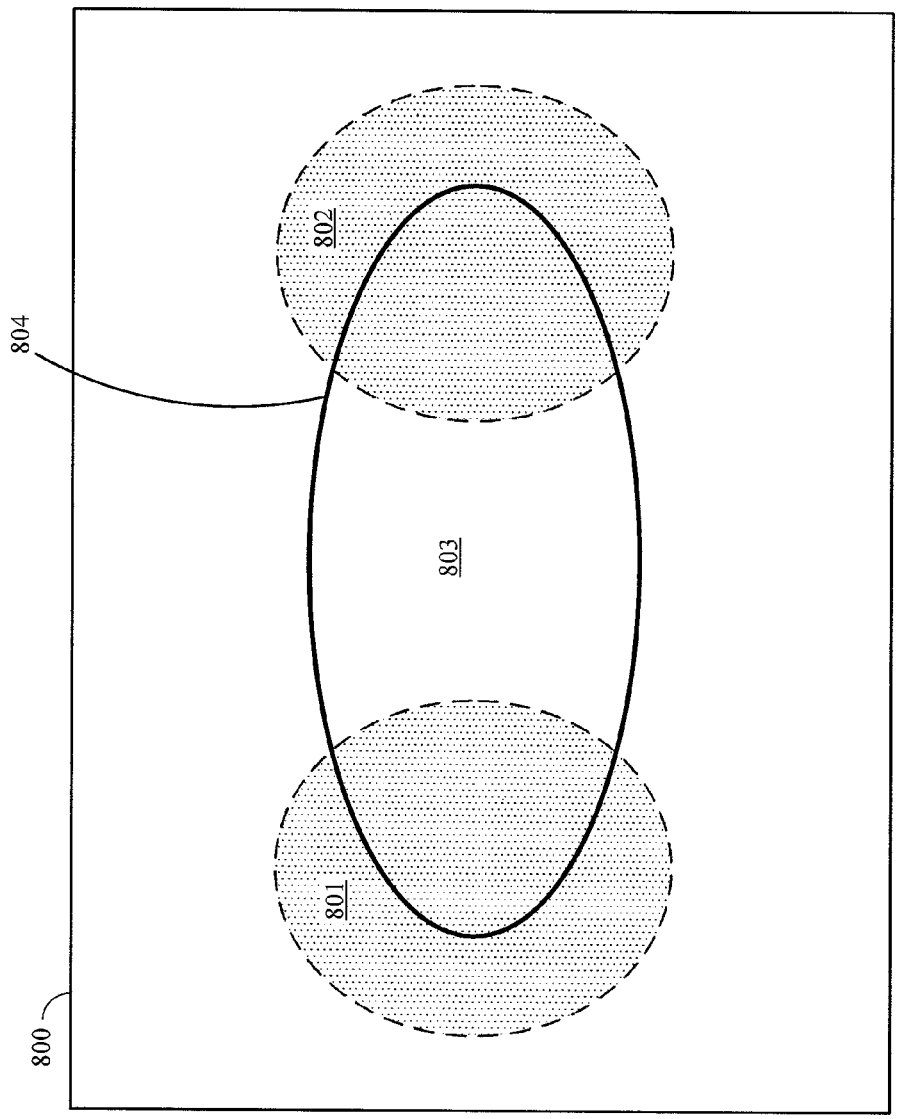
FIG. 8 is a diagram illustrative of the spatial distribution of power contributions of the coils shown in FIG. 7 during wireless power transfer.

FIG. 8 is a diagram illustrative of the spatial distribution of power contributions of the coils shown in FIG. 7 during wireless power transfer. In a similar manner to FIG. 4, FIG. 8 depicts in plan view the area 800 covered by the coils 700 of FIG. 7. Areas 801 and 802 outlined in a broken line indicate the exemplary approximate spatial distribution of the power contribution from the co-planar transmitter coils 703a and 703b of coil structure 701 to the receiver coil 705 shown in FIG. 7. Area 803 outlined in a solid line depicts the exemplary approximate spatial distribution of the power contribution from the single transmitter coil 704 to the receiver coil 705. Line 804 shown in bold represents the estimated tolerance region for power transfer above a certain threshold level for the coil arrangements shown in FIG. 7.

Compared to the estimated tolerance region of the coils shown in FIG. 4, the tolerance region 804 of coils 700 is wider in the direction parallel to a line between the centers of co-planar coils 703a and 703b, but narrower in the direction perpendicular to a line between the centers of co-planar coils 703a and 703b. As mentioned above, if we assume the view in FIG. 7 is looking forward with respect to an electric vehicle, this makes coil arrangements 700 more tolerant to transverse misalignment of the vehicle but less tolerant to longitudinal misalignment when compared to the system of FIG. 3. As has been discussed above, such coil tolerances may be desirable in certain situations, for example where the electric vehicle is controlled by a control system to automatically position the vehicle over the transmitter device.

It will be appreciated that the coils of FIG. 7, as well as other coil arrangements within the scope of various embodiments, may be mounted on the ground and on an electric vehicle in any orientation. That is, the coil arrangements may be configured such that the longitudinal direction depicted in FIG. 6 and FIG. 7 is the transverse direction and vice versa. Those of skill in the art will appreciate that the exemplary orientations discussed herein are not limiting to various embodiments and coil arrangements according to various embodiments may be used in alternative orientations, in which case any advantages of the coil arrangements discussed herein relating to a particular direction will apply equally to the same direction relative to the alternative orientation of the coil arrangements.

Figure 9:
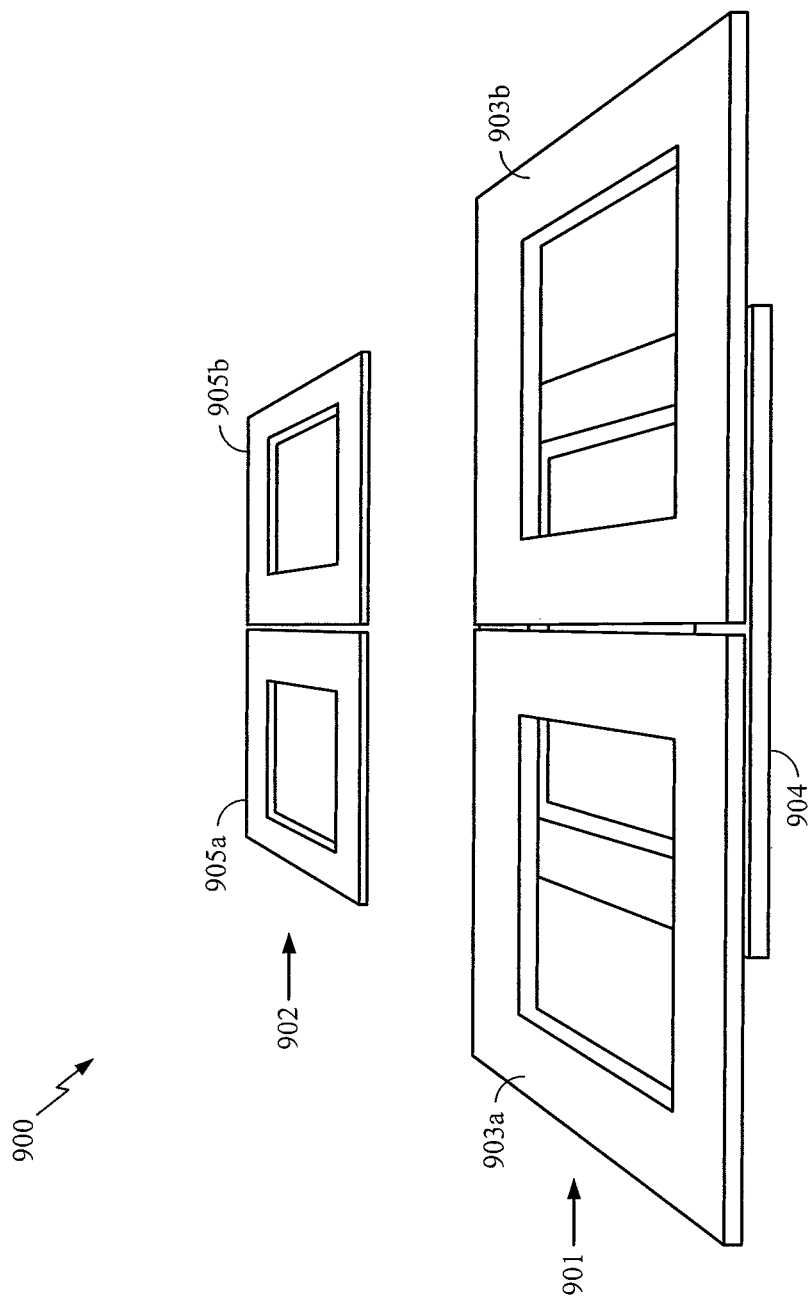
FIG. 9 is a perspective view illustration of induction coils in a wireless power transfer system according to an exemplary embodiment.

FIG. 9 is a perspective view illustration of induction coils 900 in a wireless power transfer system according to an exemplary embodiment. Coils 900 comprise transmitter coil structures 901 and 904 that are similar to the transmitter coil structures of FIG. 5 and FIG. 7 and include co-planar coils 903a and 903b in the first transmitter coil structure 901, and single transmitter coil 904. In the embodiment shown in FIG. 9, the receiver coil structure 902 comprises two co-planar receiver coils 905a and 905b.

The embodiment shown in FIG. 9 possesses the advantages discussed above of using a transmitter device having multiple transmitter coils with a receiver device having a single receiver coil arrangement, the single receiver coil structure 902 in the embodiment of FIG. 9 comprising two co-planar coils 905a and 905b. The receiver device in FIG. 9 may have additional coil as compared to the coils of FIG. 7 and therefore more electrically conducting material, typically Litz wire, may be used.

Figure 10:
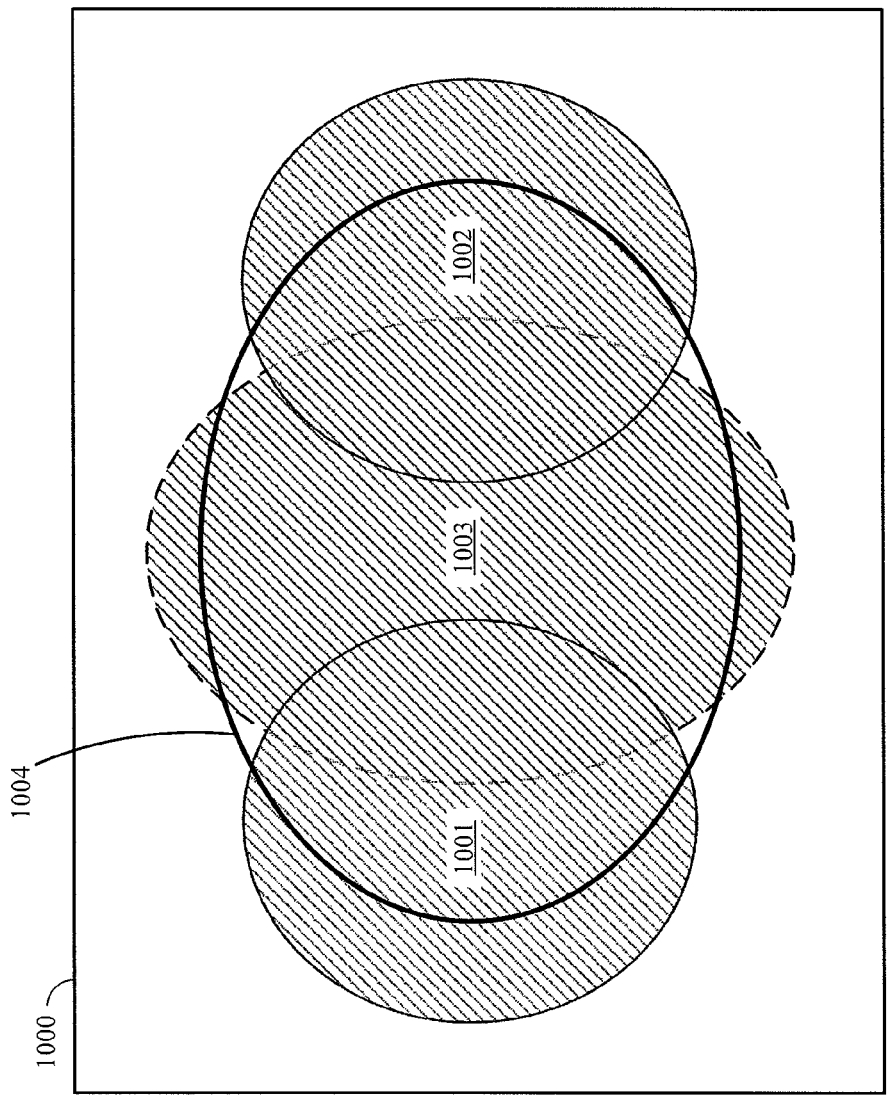
FIG. 10 is a diagram illustrative of the spatial distribution of power contributions of the coils shown in FIG. 9 during wireless power transfer.

FIG. 10 is a diagram illustrative of the spatial distribution of power contributions of the coils 900 shown in FIG. 9 during wireless power transfer. Similarly to FIG. 8, the approximate areas 1001 and 1002 of power contribution of the single transmitter coil 904 to the co-planar receiver coils 905a and 905b are shown by solid lines and the approximate area 1003 of power contribution of the two co-planar transmitter coils 903a and 903b is shown outlined in a dotted line. It should be noted that, compared to the areas of power contribution of FIG. 8, the positions of the contributions from the transmitter coil arrangements are reversed, i.e. in FIG. 8 the single transmitter coil 704 contributes power to the receiver coil centrally within area 800 while in FIG. 10 it is the co-planar transmitter coils 903a and 903b that contribute power to the receiver coil centrally within area 1000. The same reversal is true for the transmitter coils contributing to the peripheral power contribution regions in these figures.

Compared to the estimated tolerance region 404 of the coils shown in FIG. 4, the tolerance region 1004 of coil arrangements 900 is again wider in the transverse direction with respect to the electric vehicle. Therefore the coils 900 of FIG. 9 may be again more suited to circumstances requiring increased transverse misalignment tolerance than the coil arrangements shown in FIG. 3. Compared to the estimated tolerance region 804 of the coil arrangements shown in FIG. 7, the tolerance region 1004 shown in FIG. 10 is wider in the longitudinal direction. Since the widths of the tolerance regions are similar, the overall tolerance to misalignment of the coil arrangements shown in FIG. 9 is greater than those shown in FIG. 7. Therefore these coil arrangements 900 may be desirable where a larger overall degree of tolerance to misalignment is sought.

Furthermore, compared to the coils shown in FIG. 3, the coupling between the transmitter and receiver coils 901 and 902 in the embodiment shown in FIG. 9 is higher in the longitudinal direction. For any given alignment, this allows for less magnetic field emissions from the side of the coils.

Figure 11:
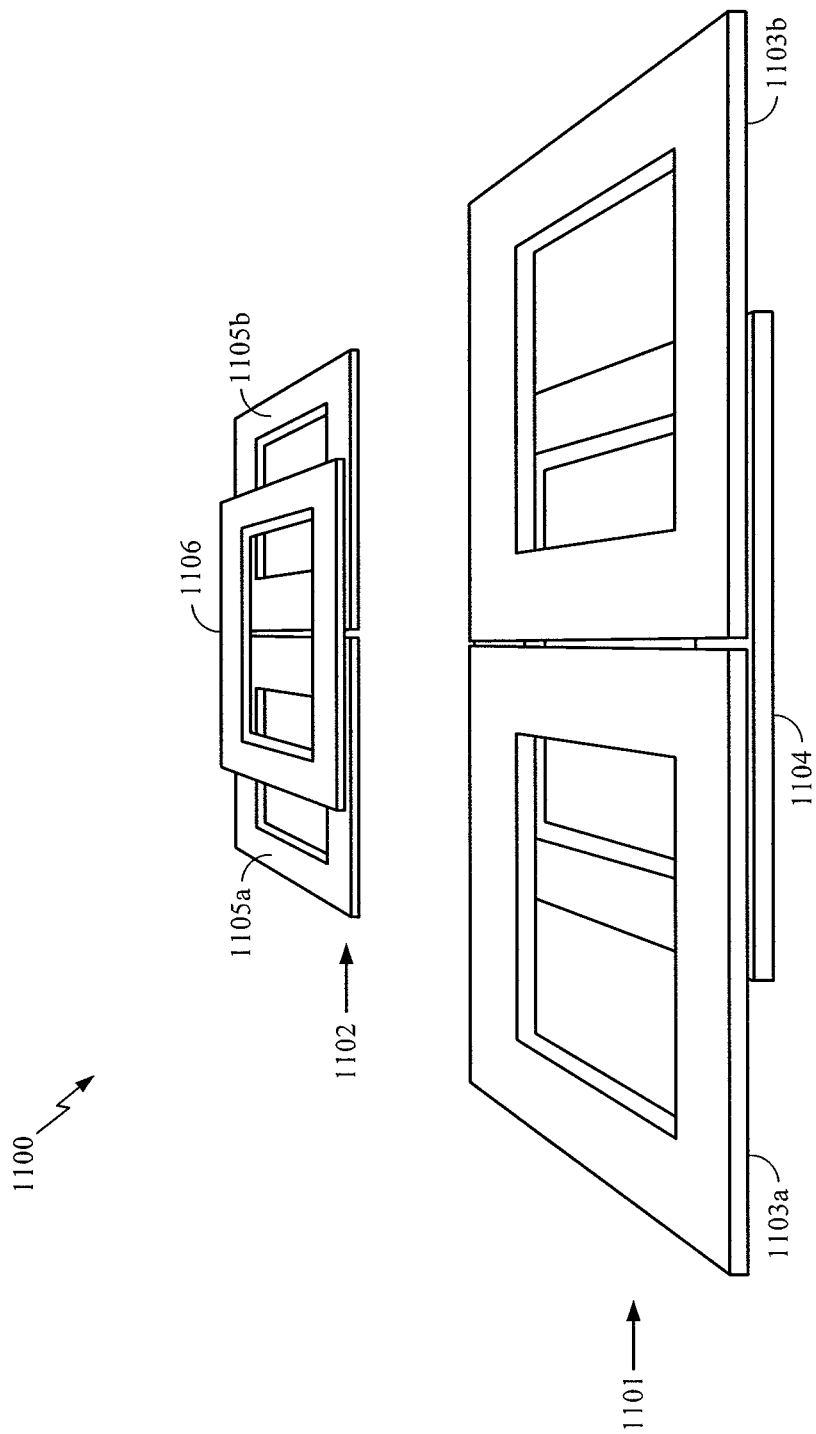
FIG. 11 is a perspective view illustration of induction coils in a wireless power transfer system according to an exemplary embodiment.

FIG. 11 is a perspective view illustration of induction coils in a wireless power transfer system 1100 according to an exemplary embodiment. Again, transmitter coil structures 1103a-b and 1104 are similar to the coil structures 501 and 502 shown in FIG. 5. In the embodiment shown in FIG. 11, receiver coil structures 1102 and 1106 also comprise coil structures comprising two co-planar receiver coils 1105a and 1105b for the coil structure 1102 and a single receiver coil 1106.

The embodiment shown in FIG. 11 has a receiver device comprising coil structures similar to that of the coil structures shown in FIG. 3. As a result, the embodiment of FIG. 11 may not realize at least some of the benefits as described with reference to FIG. 7 and FIG. 9. In fact, the cost and complexity of the coil arrangements may be higher as compared to other embodiments on both the transmitter and receiver sides of the IPT system. However, the embodiment shown in FIG. 11 may possess other benefits that may be desirable in certain circumstances.

For example, the embodiment shown in FIG. 11 may able to achieve higher power transfer rates between the transmitter and receiver coils 1101 and 1102 for a given transmitter current on account of the greater number of coils in the system. This may enable coils of FIG. 11 to be used to transfer power at a higher rate as compared to the embodiments previously described or at the same rate but using a lower transmitter or base device current. A reduction in the current in the transmitter device may be desirable for reducing the magnetic field emissions from the wireless power transfer system. The amount of magnetic field emissions from the side of the coils is approximately proportional to the current in the transmitter device, therefore the lower the transmitter device current, the lower the field emissions.

Figure 12:
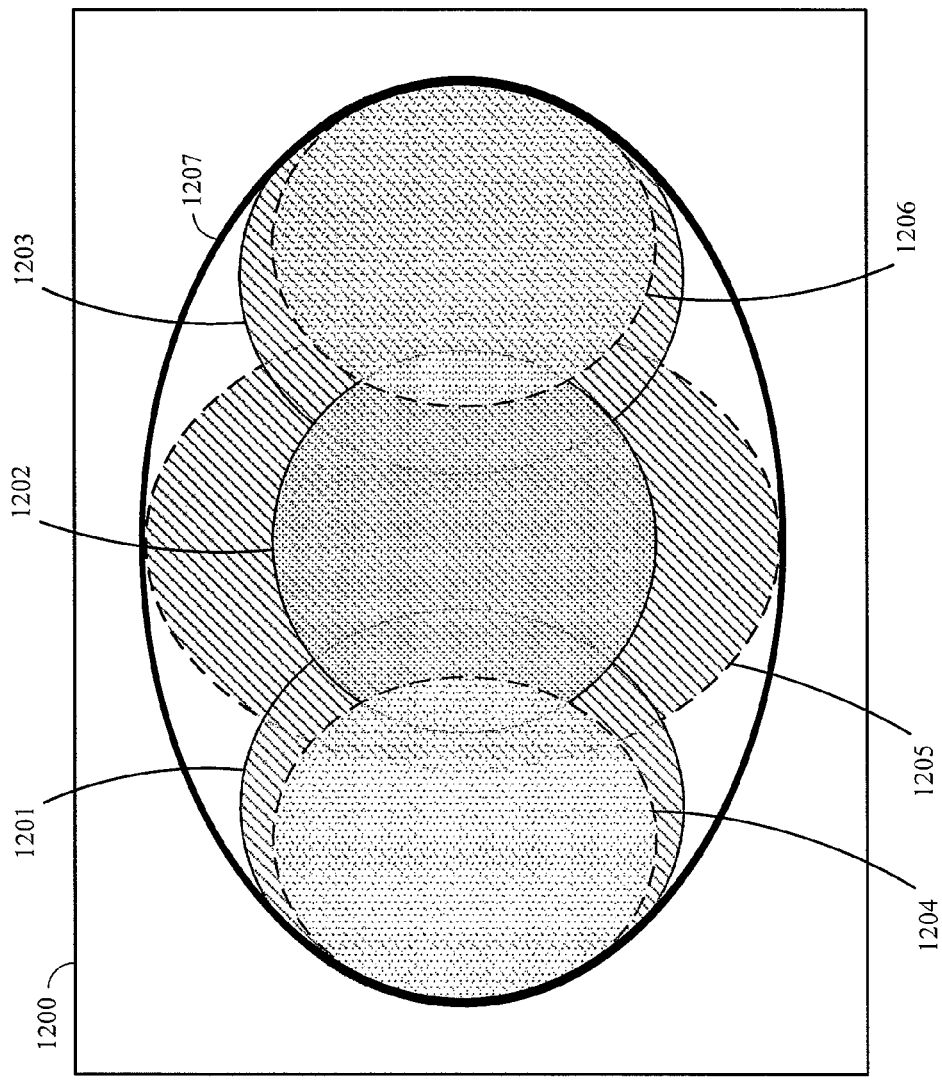
FIG. 12 is a diagram illustrative of the spatial distribution of power contributions of the coils shown in FIG. 11 during wireless power transfer.

FIG. 12 is a diagram illustrative of the spatial distribution of power contributions of the coils shown in FIG. 11 during wireless power transfer. The areas outlined by solid lines 1201, 1202 and 1203 approximate the area of power contribution from the single transmitter coil 1104 across the area 1200 of the coils 1100 while the areas outlined by dotted lines 1204, 1205 and 1206 are approximations of the spatial power contributions from the co-planar transmitter coils 1103a and 1103b. The dotted shaded areas show the power contributions as supplied to the single receiver coil 1106 while the diagonally shaded areas show the power contributions as supplied to the co-planar receiver coils 1105a and 1105b. Essentially, the power contributions of coils 1100 are the sum of the power contributions of the coils 700 of FIG. 7 and coils 900 of FIG. 9.

Bold line 1207 represents the region of tolerance to misalignment of the transmitter and receiver coils 1101 and 1102 for the coil arrangements of FIG. 11. This region is larger than the tolerance regions for the coil arrangements of FIG. 3, FIG. 7, and FIG. 9 in both the transverse and longitudinal directions. Therefore the coil arrangements of FIG. 11 are overall more tolerant to misalignment between the coils and may be useful where such a level of tolerance is desired.

Figure 13:
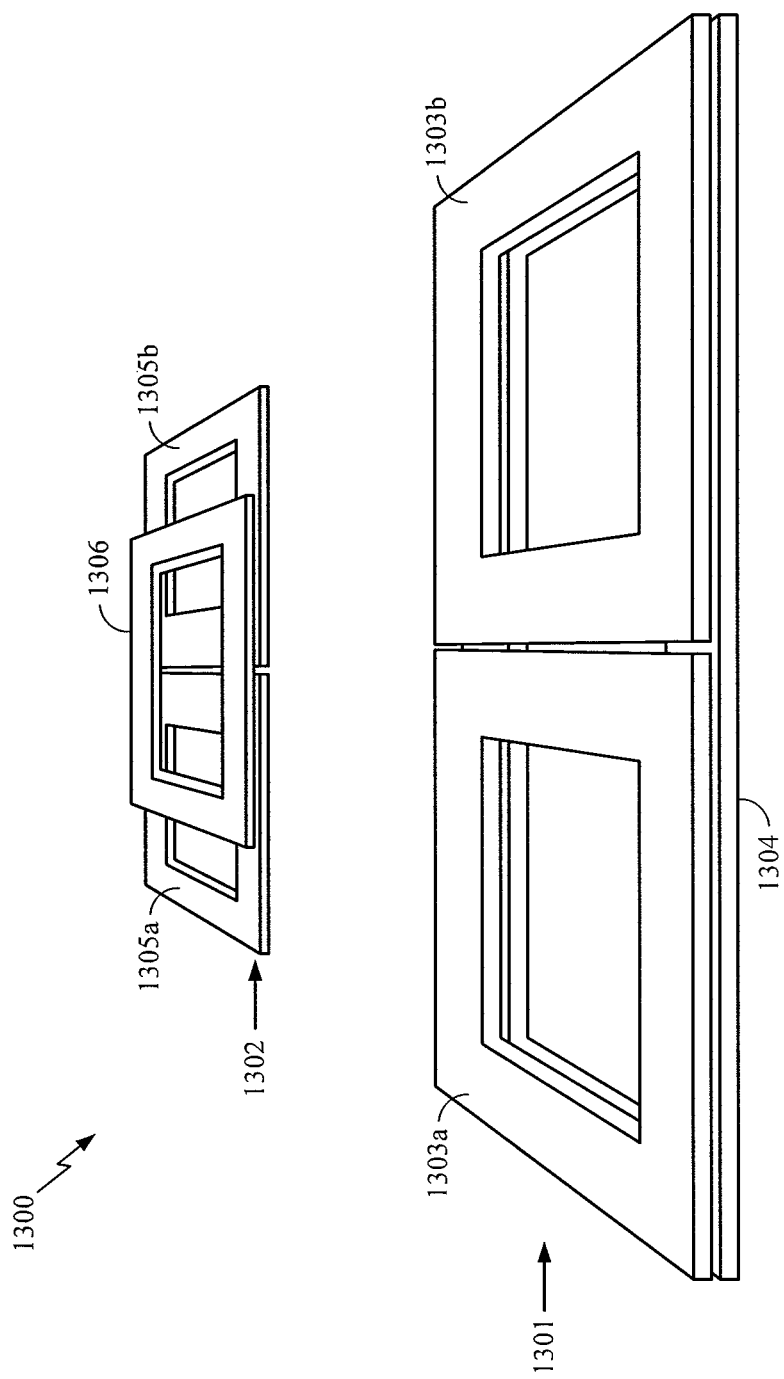
FIG. 13 is a perspective view illustration of induction coils in a wireless power transfer system according to an exemplary embodiment.

FIG. 13 is a perspective view illustration of induction coils 1300 in a wireless power transfer system according to an exemplary embodiment. In FIG. 13, the transmitter coil structures 1301 and 1304 are similar to the coil structures 601 and 602 shown in FIG. 6, respectively. The receiver coil structures 1302 and 1306 are similar to the receiver coil structures 1102 and 1106 of FIG. 11, comprising two co-planar receiver coils 1305a and 1305b and a single receiver coil 1306.

Similarly to the coils 1100 of FIG. 11, coils 1300 may result in an increased power transfer rate between the transmitter and receiver devices of an IPT system. Again, this can allow faster power transfer or lower currents for a given power transfer and therefore reduced strain on the system components and reduced magnetic field emissions. Coil arrangements 1300 may involve some increased costs and complexity in some cases on the vehicle side of the system, and a larger single coil 1304 compared to the single coil 1104 of the embodiment shown in FIG. 11, which may require more wound conducting material and therefore greater weight and cost.

Figure 14:
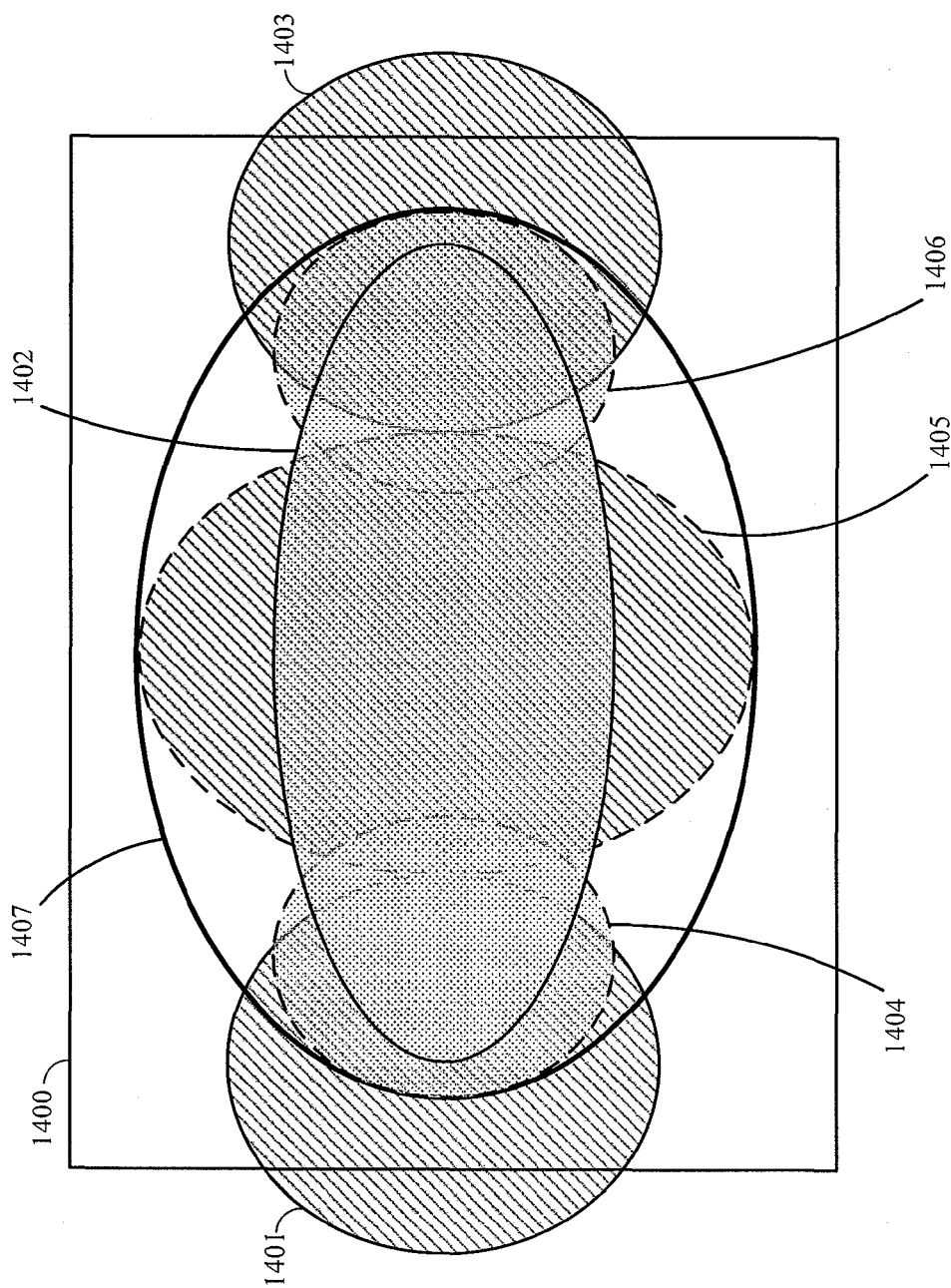
FIG. 14 is a diagram illustrative of the spatial distribution of power contributions of the coils shown in FIG. 13 during wireless power transfer.

FIG. 14 is a diagram illustrative of the spatial distribution of power contributions of the coils 1301 and 1302 shown in FIG. 13 during wireless power transfer. As can be seen in relation to FIG. 14, the misalignment tolerance region of the coils 1300 is larger than that of coils 1100 of FIG. 11. The areas outlined by solid lines 1401, 1402 and 1403 approximate the area of power contribution from the single transmitter coil 1304 across the area 1400 of the coils 1300 while the areas outlined by dotted lines 1404, 1405 and 1406 are approximations of the spatial power contributions from the co-planar transmitter coils 1303a and 1303b. The dotted shaded areas show the power contributions as supplied to the single receiver coil 1306 while the diagonally shaded areas show the power contributions as supplied to the co-planar receiver coils 1305a and 1305b. The bold line 1407 is an approximation of a region of misalignment tolerance between the transmitter and receiver coils 1301 and 1302.

Compared to the equivalent power contribution diagram of FIG. 12, it can be seen that the spatial distribution of power contributions from coils 1300 are wider in the transverse direction on account of the wider dimension of the single transmitter coil 1304. As a result, the coils 1300 of FIG. 13 have greater tolerance to misalignment in the transverse direction than those discussed previously.

Figure 15:
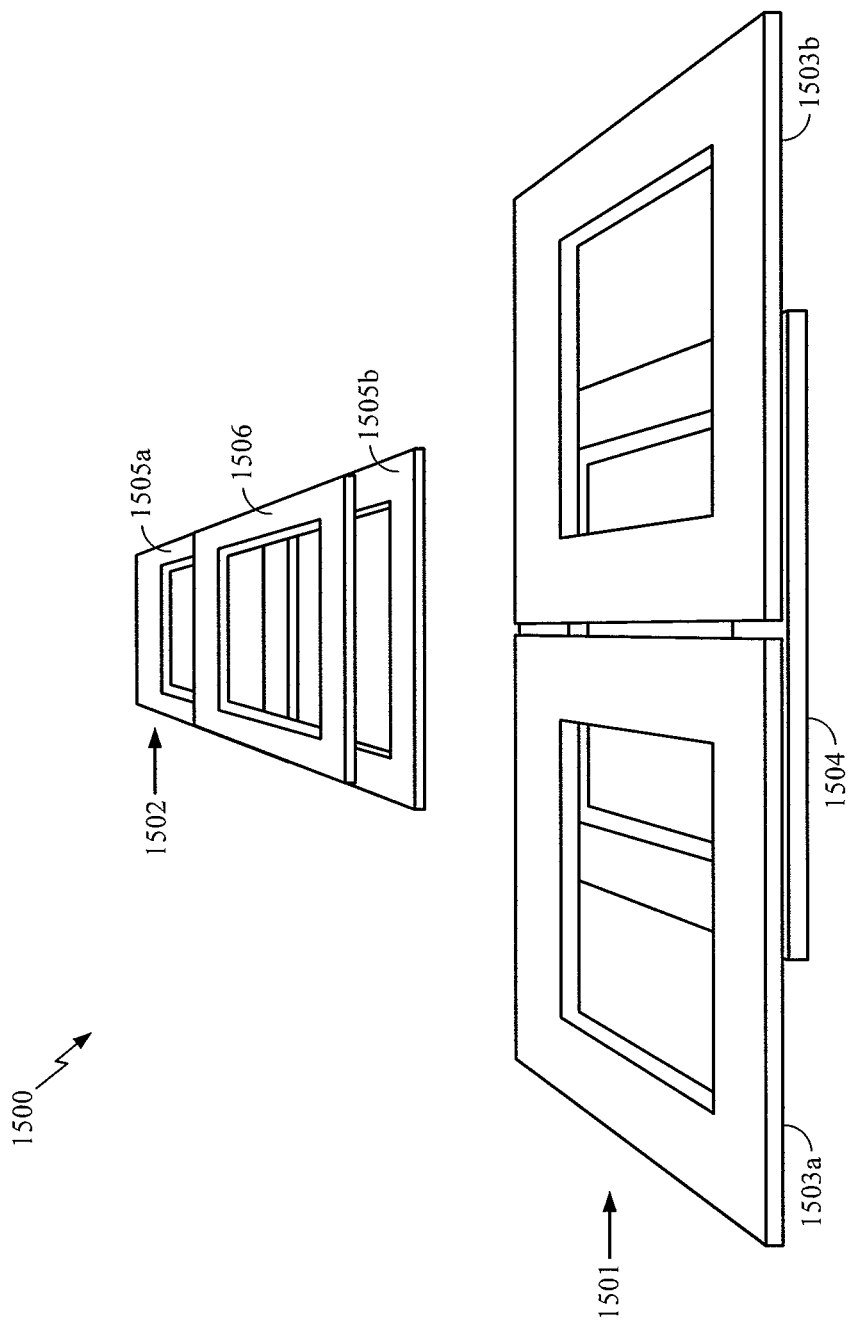
FIG. 15 is a perspective view illustration of induction coils in a wireless power transfer system according to a further exemplary embodiment.

FIG. 15 is a perspective view illustration of induction coils 1500 in a wireless power transfer system according to a further exemplary embodiment. In FIG. 15, both the transmitter coil structures 1501 and 1504 and receiver coil structures 1502 (formed of coils 1505a and 1505b) are similar to the receiver coil structures of FIG. 11 with the co-planar receiver coils 1505a and 1505b collectively positioned substantially central to single receiver coil 1506. Stated another way, the receiver apparatus includes a first conductive structure 1502 (including 1505 and 1505b) configured to wirelessly receive power via a magnetic field generated by a transmitter conductive structure (1501 or 1504 or both) having a length greater than a width. The first conductive structure 1502 has a length greater than a width and includes a first loop 1505a and a second loop 1505b enclosing a first area and a second area respectively. The first loop 1505a and the second loop 1505b have lower surfaces that are substantially coplanar. The first conductive structure has a first edge and a second edge each intersecting a first geometric line running along a length of the first conductive structure 1502. A second geometric line along the width of that runs between the first and second loops 1505a and 1505b is substantially perpendicular a line running along the length. The receiver apparatus further includes a second conductive structure 1506 configured to wirelessly receive power via the magnetic field from the transmitter conductive structure 1501. The second conductive structure 1506 encloses a third area and has a length greater than a width. The first geometric line runs along the length of the second conductive structure 1506. In some embodiments, a center of the third area enclosed by the second conductive structure 1506 is positioned substantially over a point between the first loop 1505a and the second loop 1505b.

As shown in FIG. 15, the receiver coil structures 1502 and 1506, which may be electrically connected or connectable to a load such as an electric vehicle battery, are arranged in a different orientation when interfaced with the transmitter coil structures 1501 (including coils 1503a and 1503b) and 1504, being rotated through substantially 90° in the horizontal plane compared to the receiver coils of FIG. 11 so that the co-planar receiver coils 1505a and 1505b are substantially perpendicular to the co-planar transmitter coils 1503a and 1503b. That is, the longitudinal axis of the receiver coils is generally perpendicular to the longitudinal axis of the transmitter coils 1503a and 1503b of the transmitter conductive structure 1501. Stated another way, a line between the centers of the co-planar receiver coils 1505a and 1505b is substantially perpendicular to a line between the centers of the co-planar transmitter coils 1503a and 1503b. Stated yet another way, the first geometric line described above running along the length of the second conductive structure is substantially perpendicular to a third geometric line running along the length of the transmitter conductive structure 1501.

It should be appreciated that the first and second loops 1505a and 1505b may be either a single coil wound to enclose the first and second areas, or, in another embodiment, be formed of different separate coils 1505a and 1505b to enclose the first and second areas. In fact, it should be appreciated that in any of the figures as described above showing co-planar structures, the two separate co-planar structures may be formed by either a single coil wound to enclose the first and second areas, or, be formed of separate coils to enclose the first and second areas Moreover, the first receiver conductive structure 1502 and the second receiver conductive structure 1506 may be positioned to maintain a substantial absence of mutual coupling between the first receiver conductive structure 1502 and the second receiver conductive structure 1506 as explained above.

The embodiment of FIG. 15 shares some of the advantages and disadvantages discussed above in relation to the embodiments shown in FIG. 11 and FIG. 1. However, the tolerance to misalignment in different directions has different characteristics, as will now be discussed in relation to FIG. 16, which is a diagram illustrative of the spatial distribution of power contributions of the coils shown in FIG. 15 during wireless power transfer. The areas outlined by solid lines 1601, 1602 and 1603 approximate the area of power contribution from the single transmitter coil 1504 across the area 1600 of the coils 1500 while the areas outlined by dotted lines 1604 to 1609 are approximations of the spatial power contributions from the co-planar transmitter coils 1503a and 1503b. The dotted shaded areas show the power contributions as supplied to the single receiver coil 1506 while the diagonally shaded areas show the power contributions as supplied to the co-planar receiver coils 1505a and 1505b. The bold line 1610 is an approximation of a region of misalignment tolerance between the transmitter and receiver coils.

Figure 16:
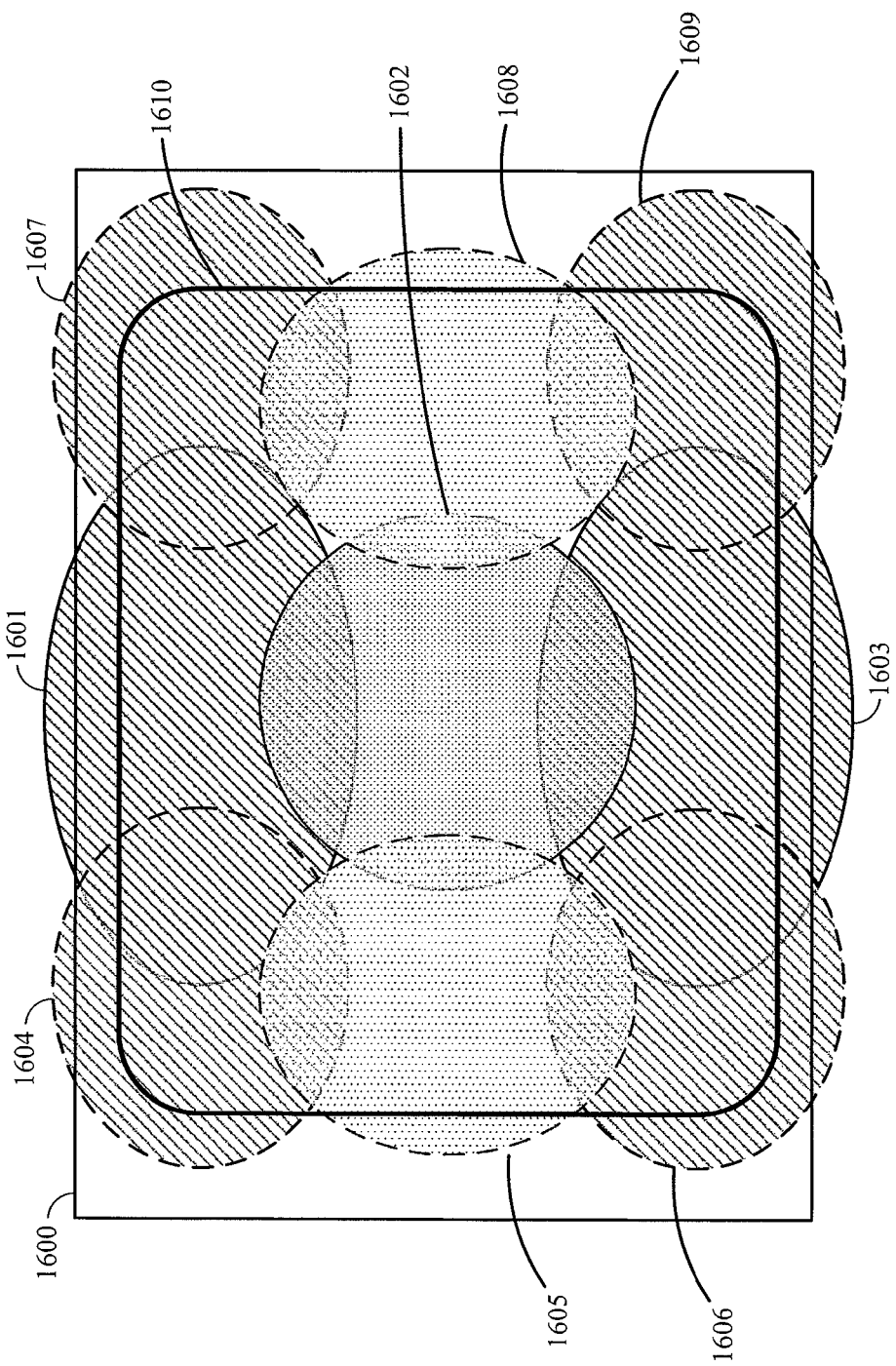
FIG. 16 is a diagram illustrative of the spatial distribution of power contributions of the coils shown in FIG. 15 during wireless power transfer.

Comparison can be made between the spatial distribution of power contributions shown in FIG. 16 with that shown in FIG. 12, which relates to the embodiment shown in FIG. 11. The dotted areas, which depict the power contributions supplied to the single receiver coil, are similarly distributed in both cases. However, in FIG. 16, the diagonally shaded areas, which depict the power contributions supplied to the co-planar receiver coils 1505a and 1505b, are situated along the top and bottom of area 1600. This contrasts to the equivalent regions in FIG. 12, which are situated in the middle of area 1200.

The overall tolerance to misalignment shown in FIG. 16 is a larger area than that of FIG. 12 and is also more rectangular in shape. Stated another way, the first and second receiver coil structures 1502 and 1506 collectively have a first center point (e.g., a center point of a geometric rectangle covering the surface area of the coil structures 1505a-b and 1506). The transmitter conductive structure 1502a-b and 1504 has a second center point (e.g., a center point of a geometric rectangle covering the surface area of the transmitter conductive structure). A set of points defined by offset distances between the first and second center points, in which an amount of power transfer is above a threshold is substantially rectangular. The effect of this is to reduce the dependency of the amount of tolerance to misalignment in a first direction to the amount of misalignment in a direction perpendicular to the first direction. It can be seen from bold line 1610 in FIG. 16 that, even if a vehicle is poorly aligned in the transverse direction, the degree of tolerance in the longitudinal direction is little affected unless the transverse misalignment is significant (e.g., approaching the borders of the region bounded by line 1610). This can be compared to the overall tolerance of the embodiment shown in FIG. 11, which is depicted by line 1207 in FIG. 12, in which the oval-shaped nature of line 1207 indicates misalignment in the transverse direction reduces the degree of tolerance to misalignment in the longitudinal direction, and vice versa.

As a result, in the embodiment shown in FIG. 15, misalignment in one direction does not necessarily compound the chances of misalignment in the other direction. It also allows manufacturers to design both transmitter and receiver coil arrangements to cater for the tolerance requirements of a given system or situation independently in both the transverse and longitudinal directions. This flexibility may simplify the design of suitable coil arrangements.

The large tolerance to misalignment of the embodiment shown in FIG. 15 compared to other embodiments described above may allow the size of the coil arrangements to be decreased, thus maintaining a particular degree of tolerance while also reducing component costs. A reduction in size of the coil arrangements may also reduce magnetic field emissions beyond the boundaries of a vehicle.

Figure 17:
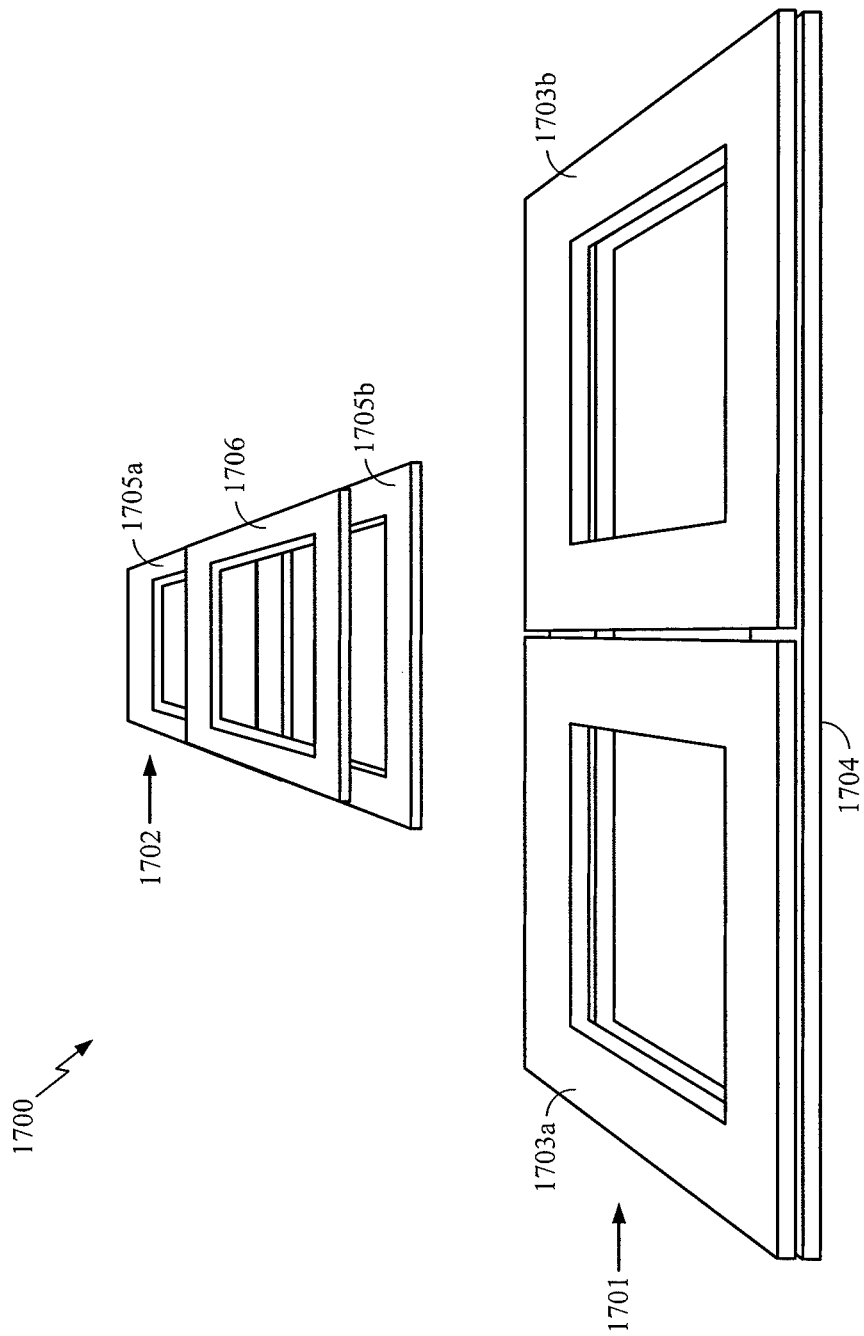
FIG. 17 is a perspective view illustration of induction coils in a wireless power transfer system according to a still further exemplary embodiment.

A similar exemplary embodiment is shown in FIG. 17, which is a perspective view illustration of induction coils 1700 in a wireless power transfer system according to a still further exemplary embodiment. In FIG. 17, both the transmitter coil structures 1701 and 1704 and receiver coil structures 1702 and 1706 are similar to the receiver coils of FIG. 13, however the receiver coil structures 1702 and 1706 are arranged in a different orientation, being rotated through substantially 90° in the horizontal plane compared to the receiver coil structures 1302 and 1306 of FIG. 13 so that the co-planar receiver coils 1705a and 1705b are substantially perpendicular to the co-planar transmitter coils 1703a and 1703b.

Figure 18:
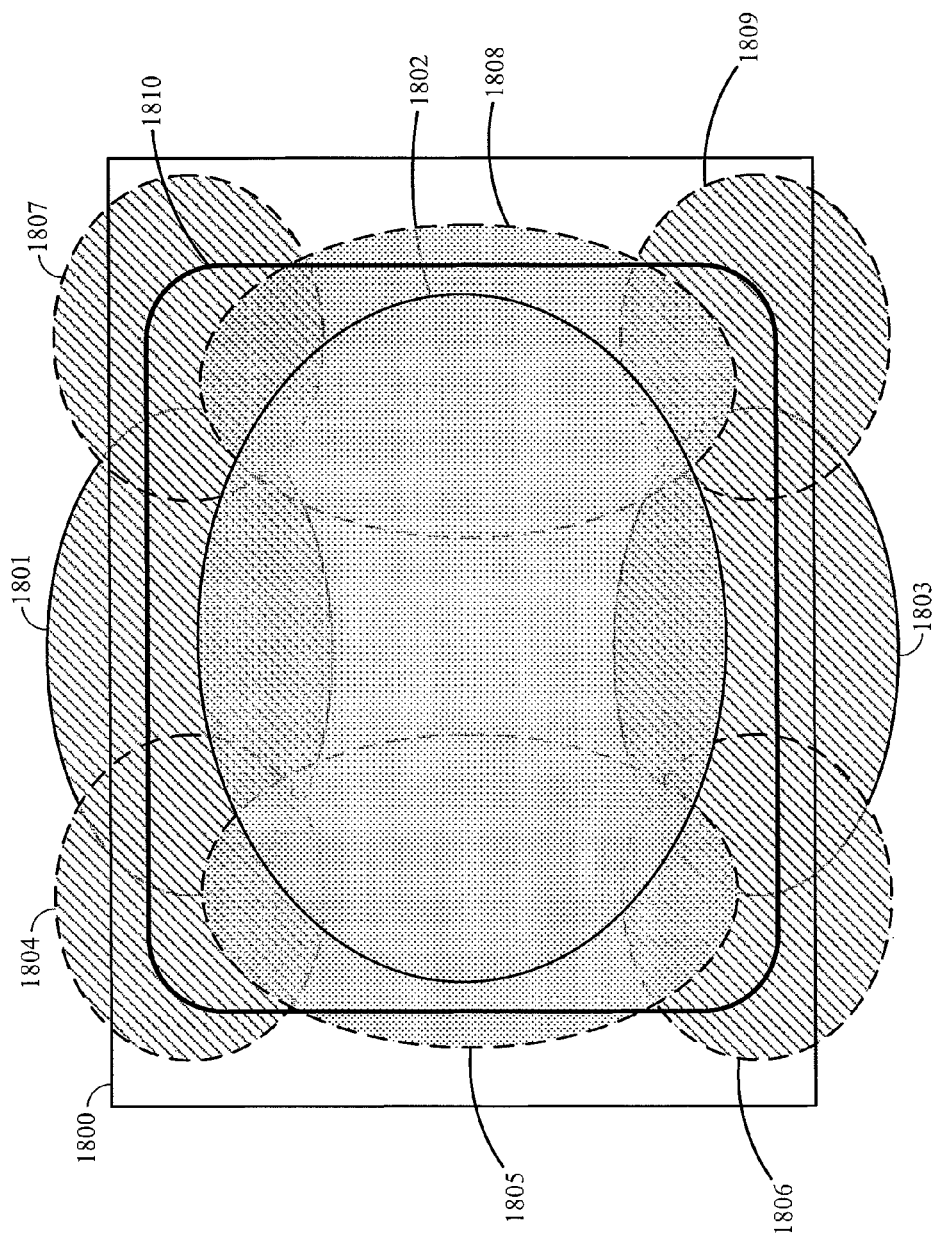
FIG. 18 is a diagram illustrative of the spatial distribution of power contributions of the coils shown in FIG. 17 during wireless power transfer.

The embodiment of FIG. 17 shares many of the advantages and disadvantages discussed above in relation to the embodiment of FIG. 15. Furthermore, it has similar characteristics of misalignment tolerance, as shown in FIG. 18, which is a diagram illustrative of the spatial distribution of power contributions of the coils shown in FIG. 17 during wireless power transfer. The areas outlined by solid lines 1801, 1802, and 1803 approximate the area of power contribution from the single transmitter coil 1704 across the area 1800 of the coils 1700 while the areas outlined by dotted lines 1804 to 1809 are approximations of the spatial power contributions from the co-planar transmitter coils 1703a and 1703b. The dotted shaded areas show the power contributions as supplied to the single receiver coil 1706 while the diagonally shaded areas show the power contributions as supplied to the co-planar receiver coils 1705a and 1705b. The bold line 1810 is an approximation of a region of misalignment tolerance between the transmitter and receiver coils.

The misalignment tolerance characteristics of the embodiment of FIG. 17 are similar to those of the embodiment of FIG. 15 and described above in relation to FIG. 16. However, the regions of power contribution from the single transmitter coil 1704, as depicted by areas 1801, 1802 and 1803, are larger than the equivalent regions in FIG. 18. This reflects the larger size of the single transmitter coil 1704 compared to the single transmitter coil 1504 in FIG. 15. As a result there is greater overlap between regions of power contribution from the different transmitter coils in FIG. 18 compared to FIG. 16. Therefore, in comparison to the embodiment of FIG. 15, the embodiment of FIG. 17 may provide a greater range of misalignment positions between the coil arrangements in which more than one of the transmitter and/or receiver coils are transmitting/receiving power contributions. This may result in more efficient power transfer in these positions and a system that may still be able to transfer power if one of the transmitter coil arrangements malfunctions.

In the embodiments of FIG. 15 and FIG. 17 the receiver coil structures are substantially perpendicularly oriented relative to the transmitter coil structures. It is the relative orientation of the coil structures that is relevant and embodiments may be provided in which the receiver coil arrangements are mounted in a transverse orientation on the underside of an electric vehicle (as shown in FIG. 15 and FIG. 17 assuming the figures are viewed longitudinally relative to the vehicle), a longitudinal orientation, or any other orientation. It will also be appreciated that, for some arrangements of transmitter coils an electric vehicle having receiver coil structures mounted underneath may be able to orient the receiver coils in any orientation relative to the transmitter coils depending on the direction from which the vehicle drives over the transmitter coils and hence the orientation of the vehicle. Therefore the controller or driver of an electric vehicle may have a choice as to which way the transmitter and receiver coils are oriented during a charging operation. This choice may be dictated by the desired characteristics of charging associated with the possible orientations. However, some transmitter coil arrangements may be mounted on the ground such that a vehicle is practically only able to drive over it from one direction, for example in a parking space or garage.

More generally, at least some embodiments include receiver and transmitter coil structures that are orientated such that the co-planar receiver coils and co-planar transmitter coils do not couple, or have a coupling below a predetermined threshold, when the receiver and transmitter coil structures are well aligned, for example when the physical centers of receiver and transmitter coil arrangements are vertically aligned. The above description has described configurations in which the level of coupling between the receiver and transmitter coils is very low when the coils are substantially perpendicularly oriented, for example.

In other embodiments there may be provided transmitter coil structures similar to those shown in FIG. 15 and FIG. 17 without the single transmitter coil 1504 or 1704. That is, the transmitter coil arrangements in these embodiments comprise only co-planar transmitter coils. It can be seen from FIG. 16 and FIG. 18 that if a receiver coil structures such as is shown in the figures is aligned centrally with such transmitter coil structures then there may be lower rates of power transfer than could be achievable if the single transmitter coil was present.

Referring again to the coils 600 of FIG. 6, the direction of the current in the coil arrangements may be controlled in order to increase power transfer efficiency and reduce some negative effects as will now be described and as will be further described below.

In an embodiment, the currents in the co-planar transmitter coils 601*a* and 601*b* may be configured to flow in opposite directions such that the currents in adjacent portions of co-planar transmitter coils 601*a* and 601*b* flow in the same direction. For example, the current in coil 601*a* may flow clockwise while the current in coil 601*b* flows counterclockwise, or vice versa. For a given flow direction of the currents in the co-planar transmitter coils 601*a* and 601*b*, the current in the single large transmitter coil 602 can flow in one of two directions, either clockwise or counterclockwise, i.e. either in the same direction as the current in coil 601*a* or in the same direction as the current in coil 601*b*. If the current in the single coil 602 flows in the same direction as coil 601*a*, then the magnetic flux field produced by the transmitter coil arrangements 600 will be offset from the center of the coil arrangements in the direction of coil 601*a*. Equally, the magnetic flux field will be offset in the direction of coil 601*b* if the current in the single coil 602 flows in the same direction as coil 601*b*. Therefore, by changing the direction in which the current flows in either the single transmitter coil 602 or in the co-planar transmitter coils 601*a* and 601*b*, the position of the strongest magnetic flux density can be varied.

The same consideration applies to the direction of currents in the transmitter coils 500 of FIG. 5 and other coils within the scope of various embodiments, although the amount of offset of the magnetic field as a consequence of switching the current in either the co-planar coils 501*a* and 501*b* or the single coil 502 may be less than that of the coil arrangements of FIG. 6 because the edges of the coil arrangements are not as aligned.

During wireless power transfer in a wireless power transfer system, if the receiver coil arrangements are misaligned with the transmitter coil arrangements then the direction of currents in the coils can be controlled to offset the position of the region of greatest magnetic field strength to increase the level of coupling between the transmitter and receiver coils and therefore increase the efficiency of wireless power transfer. To that end, the wireless power transfer system may comprise a mechanism operable to detect the position of the receiver device in relation to the transmitter device. An exemplary position detection mechanism will be discussed further below. Furthermore, the system may comprise a mechanism for controlling the current in either or both of the co-planar coil arrangement or single coil arrangement of the transmitter device based on the detected positions of the transmitter and receiver devices. The control mechanism may be comprised in the transmitter device in an embodiment.

The control mechanism may be operable to alter the direction of current in one or both of said coils in response to the position of the receiver coil arrangements in relation to the transmitter coils as identified by the position detection mechanism. For example, if a receiver coil is misaligned transversely in the direction of transmitter coil 601*a* as shown in FIG. 6, the control mechanism may cause the current in the single coil 602 to flow in the same direction as the current in the transmitter coil 601*a*, which could be either clockwise or counterclockwise. This causes the generated magnetic field to be offset transversely in the direction of transmitter coil 601*a* therefore directing the magnetic field generally towards the receiver coils. In an alternative example, the direction of current in the co-planar coils may be altered. In these examples, the currents in the coils are controlled such that the current in whichever co-planar coil 601 is nearest the misaligned receiver device flows in the same direction as the current in the single coil 602.

If the transmitter and receiver coils are well aligned it may be more efficient not to offset the region of highest magnetic field strength generated by the transmitter coils. If the transverse alignment of the transmitter and receiver coil arrangements is detected to be within a certain predefined threshold by the position detection mechanism then the control mechanism may be operable to zero the current flowing in either the co-planar transmitter coils 601*a* and 601*b* or the single coil 602 such that the generated magnetic field is centralized over the transmitter coil structures and aligned better with the receiver coils than if the field was offset.

In another embodiment, the wireless power transfer system may be able to determine the relative orientations of the wireless power receiver device and the wireless power transmitter device. A mechanism for determining the relative orientations of the receiver and transmitter devices may be provided in addition to the position detection mechanism in some embodiments. Based on the determined relative orientations and/or the relative positions of the wireless power receiver device and the wireless power transmitter device, a current supply mechanism may supply current to the transmitter coils accordingly, for example to increase power transfer rates or efficiency.

There will now be described an example with reference to the embodiment shown in FIG. 17.

In the positions shown in FIG. 17, the receiver coil structures 1702 and 1706 may be considered well aligned with the transmitter coil structures 1701 and 1704 since the centers of each coil arrangement are in approximate vertical alignment. Referring to the spatial distribution of power contributions shown in FIG. 18, the most significant contribution of power to the middle section of area 1800 in the transverse direction is from the single transmitter coil 1704, as shown by areas 1801, 1802 and 1803. Therefore if the transmitter and receiver coil arrangements are in this alignment position, and if the coil arrangements are perpendicularly oriented to each other, it may be beneficial to supply current to the single transmitter coil 1704 only. Supplying current, and therefore power, to the co-planar transmitter coils 1703a and 1703b in this case may result in little of that power being transferred to the receiver coils, which may be inefficient in some cases. Zeroing the current to the co-planar transmitter coils may also avoid an asymmetric magnetic field being produced, which again may reduce power transfer efficiency in some cases.

If however, the receiver coil arrangements 1702 are misaligned transversely relative to the transmitter coil arrangements 1701, for example misaligned in the direction of the co-planar transmitter coil 1703a, more efficient power transfer may be achievable by supplying current to the transmitter coils differently. FIG. 18 shows that significant contribution of power to regions near the transverse edges of area 1800 comes from the co-planar transmitter coils 1703a and 1703b, as shown by areas 1804-1809. Therefore, misalignment towards the transverse edge of area 1800 may mean supplying current to just the co-planar transmitter coils 1703a and 1703b, and zeroing the current supplied to the single transmitter coil 1704 provides increased power transfer efficiency. Alternatively, the direction of the current in the transmitter coil 1703a nearest to the receiver coil arrangements may be controlled to be the same as that in the single transmitter coil 1704, as discussed above.

Therefore, the determination of both the relative orientations of the transmitter and receiver coil arrangements, as well as their relative positions, may be used to control how current is supplied to the transmitter coils.

Any appropriate system or method may be used to determine the relevant positions and orientations of the receiver and transmitter devices.

Figure 19:
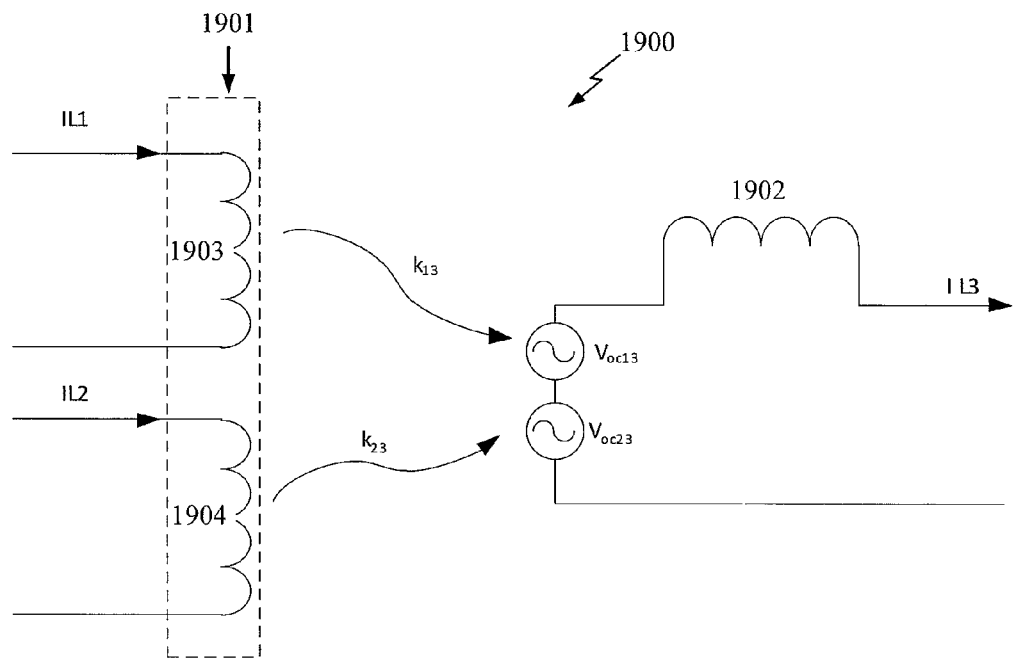
FIG. 19 is a schematic diagram of induction coils in a wireless power transfer system, in accordance with an exemplary embodiment.

FIG. 19 is a schematic view of induction coils in a wireless power transfer system 1900 according to an exemplary embodiment. The coils may be configured in any of the configurations as described above with reference to FIGS. 3-18.

The system 1900 comprises transmitter or "primary" coil structure 1901, and receiver or "secondary" coil structure 1902, as generally illustrated by the coil configurations as described above.

The primary coil structure 1901 may comprise first primary coil structure 1903 having an associated inductance $L_1$, and a second primary coil structure 1904 having an associated inductance $L_2$. The secondary coil structure 1902 may have an associated inductance $L_3$.

In operation, as generally described with reference to FIG. 2, power is delivered to the first primary coil structure 1903 with a current $I_{L1}$, and to the second primary coil structure 1904 with a current $I_{L2}$. A magnetic field is emitted as a result, which induces a voltage causing a current $I_{L3}$ to pass through the secondary coil structure 1902.

Each of the first and second primary coil structures 1903 and 1904 is coupled with the secondary coil structure 1902. The coupling coefficient between the first primary coil structure 1903 and the secondary coil structure 1902 may herein be referred to as "$k_{13}$," while coupling coefficient between the second primary coil structure 1904 and the secondary coil structure 1902 may herein be referred to as "$k_{23}$."

The coupling coefficients may be determined by any suitable mechanism. In an exemplary embodiment, the receiver side, for example electric vehicle charging system 214 of FIG. 2, may comprise a mechanism for measuring the short circuit current across the secondary coil structure 1902. This can be measured by selectively closing switches in a sub-circuit. For a given base current (or currents) in the primary coil structure, the short circuit current across the secondary inductor is indicative of the level of coupling between them. Any appropriate mechanism of measuring the short circuit current may be used.

In some embodiments, particularly in a series tuned system, open circuit voltage may be measured and used to determine coupling. It should be appreciated that measurement of short circuit current or open circuit voltage will be dependent on the tuning topology. If tuning is such that a current source output is presented, for example as in parallel tuning, short circuit current will need to be measured as the circuit cannot be opened. Conversely, if a voltage source output is presented, such as in series tuning, open circuit voltage will be required in order to determine the coupling coefficient.

It should be appreciated that the mechanism for measuring voltage and mechanism for measuring current may be distinct devices in communication with one or more devices of a wireless power transfer system, or integrated into said devices.

In order to determine the coupling coefficient between each of the primary and secondary coil structures 1901 and 1902, power may be supplied to each of the primary coil structures 1903 and 1904, and/or combinations thereof, in a sequence, and measurements of the individual contributions to power induced in the secondary coil structure 1902 made. For example, power may be supplied to only the first primary coil structure 1903 only for a certain number of milliseconds (e.g., 250 milliseconds), and the resulting current and/or voltage of power induced in the secondary coil structure 1902 measured. Power may then be supplied to only the second primary coil structure 1903 for a certain number of milliseconds (e.g., 250 milliseconds), and the resulting current and/or voltage of power induced in the secondary coil structure 1902 measured. Power may then be supplied to both of the primary coil structures 1903 and 1904 run together for a certain number of milliseconds (e.g., 250 milliseconds) and the resulting current and/or voltage of power induced in the secondary coil structure 1902 measured. From these current and/or voltage measurements, coupling coefficients between each of the primary and secondary coils 1901 and 1902 may be determined.

Once the coupling coefficients have been determined, the contributions of each primary coil structure 1903 and 1904 to each secondary coil structure 1902 may be used to determine the magnitudes and/or relative phases of currents $I_{L1}$ and $I_{L2}$ to be applied in the transmission or primary coils 1901. In exemplary embodiments, determination of the coupling coefficients and/or determination of control parameters for currents $I_{L1}$ and $I_{L2}$ may be performed only once at the time of initial alignment of the transmitter and receiver sides, periodically, in real time according to detected changes in power transfer characteristics, or on communication between the transmitter and receiver sides. In addition, the magnitude and/or relative phases of currents $I_{L1}$ and $I_{L2}$ are controlled to reduce emissions from the system 1900 and to maintain emissions below a threshold.

It should be appreciated that application of the exemplary scenarios outlined below may be heavily influenced by the configuration of a particular system, and the objectives of the system designer—for example with regard to minimizing losses or reducing stress on components within the system.

The higher the coupling coefficient is between a transmitter device and a receiver device, the more efficient power transfer will be when wirelessly transmitting power from the transmitter device to the receiver device. Therefore, the value of the measured coefficients may be used as an input in determining the magnitudes of the currents $I_{L1}$ and $I_{L2}$ to be applied. For example, where $k_{13} > k_{23}$, the magnitude of $I_{L1}$ may be increased relative to $I_{L2}$ (or the second primary coil structure 1904 completely turned off) in order to take advantage of the closer coupling and transfer power more efficiently. While large changes in current in the primary coil structure 1901 may be generally undesirable due to stresses on the power supply or supplies, some degree of variability may be tolerated without adversely impacting the efficiency of the system.

Further, power delivery through certain coil structures may be prioritized in order to utilize generally more efficient operation of certain coil types. For example, increasing the current through the substantially co-planar transmitter coils 601a and 601b of FIG. 6 may be prioritized over the current through the single planar transmitter coil 604.

In an exemplary embodiment, it may be preferable to balance the magnitude of both currents to be as similar as possible in order to reduce losses.

In another exemplary embodiment, it may be desirable to determine a constant ratio of the magnitudes of the currents according to the known relative losses (for example resistive losses) in each primary coil. In doing so, the current magnitude may be controlled such that the losses are balanced in each coil arrangement.

In exemplary embodiments, the phase of the currents $I_{L1}$ and $I_{L2}$ may be controlled in addition to, or in place of, the magnitude of said currents. Both the phase of the currents and the magnitude may be adjusted simultaneously. The voltages $V_{oc13}$ and $V_{oc23}$ induced in the secondary coil structure 1902 as the result of magnetic fields emitted by the first and second primary coil structures 1903 and 1904 respectively may be given by the equations:

$$V_{oc13} = \omega k_{13} \sqrt{L_1 L_3} I_{L1} \sin(\omega t); \text{ and}$$

$$V_{oc23} = \omega k_{23} \sqrt{L_2 L_3} I_{L2} \sin(\omega t + A),$$

where $L_1$ is the inductance of the first primary coil structure 1903, $L_2$ is the inductance of the first primary coil structure 1904, and A is the phase difference between currents $I_{L1}$ and $I_{L2}$.

The phase differential may be controlled, for example, in order to tune or detune the system in order to achieve desirable system conditions. Current $I_{L3}$ may be determined by the following equation:

$$I_{L3} = \frac{(R - jX)(V_{OC13} + V_{OC23}\cos(A) + jV_{OC23}\sin(A))}{X^2}$$

where R is the resistance of the secondary coil arrangement 1902, and X is the reactance of same.

The following equations may be used to determine the relative amounts of VAR and real load onto the power supply, normalized relative to reactance in order to allow application of the results of the equations to any receiver comprising a secondary coil structure regardless of inductance:

$$\frac{Z_{r13}}{X} = \frac{V_{OC13}}{(Q - j)(V_{OC13} + V_{OC23}\cos(A) + jV_{OC23}\sin(A))}$$

$$\frac{Z_{r23}}{X} = \frac{V_{OC23}\cos(A) + jV_{OC23}\sin(A)}{(Q - j)(V_{OC13} + V_{OC23}\cos(A) + jV_{OC23}\sin(A))}$$

In an embodiment, the phase of the currents between the two primary coil structures 1903 and 1904 is one of either zero degrees or 180 degrees. The particular phase difference, either 0 or 180 degrees, depends on the position of the secondary coil relative to each of the two primary coils 1901.

Figure 20:
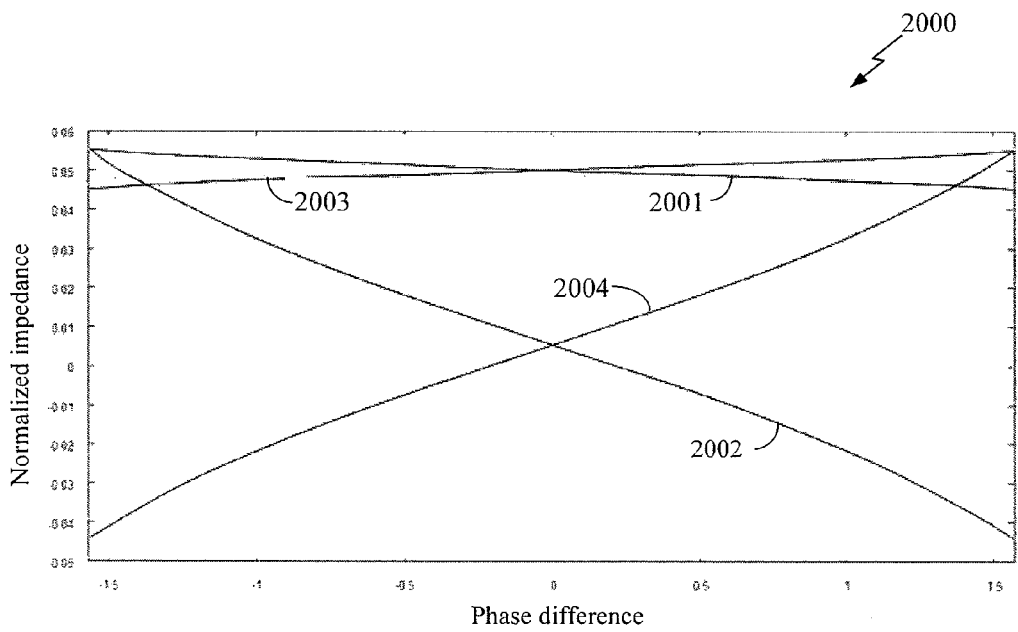
FIG. 20 is a plot illustrating impedance of the induction coils as shown in FIG. 19 during wireless power transfer.

FIG. 20 is a graph 2000 illustrating the real and imaginary components of the impedance seen at the secondary coil structure 1902 of FIG. 19, plotting normalized impedance against phase difference A between currents $I_{L1}$ and $I_{L2}$. Trace 2001 and trace 2002 are the real and imaginary loads seen by $V_{oc13}$, while trace 2003 and trace 2004 are the real and imaginary loads seen by $V_{oc23}$.

In exemplary embodiments the phase difference may be controlled to be within $-0.5 < A < 0.5$. In doing so, tuning of the system by way of relative phase as described above may be achieved without causing stresses on the power supply which may otherwise negate the benefits of tuning.

Figure 21A:
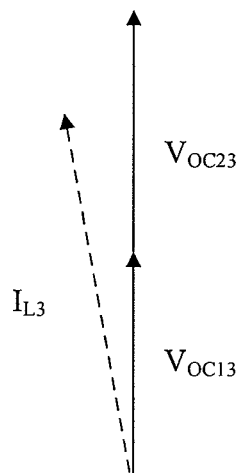
FIGS. 21A, 21B, and 21C are vector diagrams illustrating voltage and current seen at the secondary inductive coil as shown in FIG. 19 during wireless power transfer.
Figure 21B:
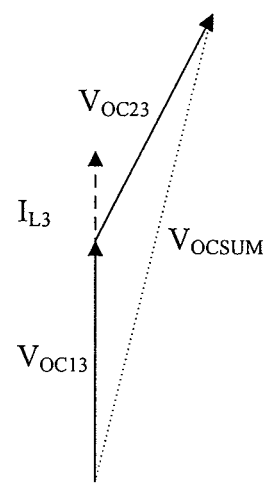
Figure 21C:
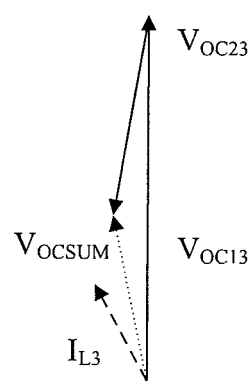

FIGS. 21A, 21B, and 21C illustrate the effects of phase difference on current and voltage. FIG. 21A is a vector diagram illustrating an exemplary scenario in which currents $I_{L1}$ and $I_{L2}$ have the same phase. The phase difference between the voltages $V_{oc13}$ and $V_{oc23}$, and the current $I_{L3}$ is a natural result of parallel tuning.

FIG. 21B is a vector diagram illustrating an exemplary scenario in which $I_{L1}$ leads $I_{L2}$. The resulting voltage seen by the system ($V_{ocsum}$) may be reduced in comparison with that of FIG. 21A. This may reduce the inductance at the primary coil structure 1901. This adjustment in inductance may be used to tune the system 1900 to improve coupling. It is envisaged that if the phase difference is too great one primary coil structure may be capacitive and the other inductive, which could detune the two coil structures in opposite directions. This may reduce efficiency in the components supplying power to the coil arrangements—for example an H-bridge being used in an inverter—which may be required to drive the extra VAR load, or even cause failure if this load was too large. As discussed previously, it is envisaged that the system may be operated within a limited range with regard to phase difference in order to reduce these effects.

FIG. 21C is a vector diagram illustrating an exemplary scenario in which currents $I_{L1}$ and $I_{L2}$ are substantially antiphase, such that the voltages $V_{oc13}$ and $V_{oc23}$ oppose each other to result in a $V_{ocsum}$ less than individual coil arrangement contributions. The resulting reduction in $I_{L3}$ and $V_{ocsum}$ may lead to a reduced power demand on the transmitter.

Due to the reduced power demands, the conduction angle of any inverters associated with the power supply may be higher. This indicates that the time over which power is conducted is increased, reducing the peak currents and associated stress borne by the components.

There will now be described, with reference to FIG. 22, components of a wireless power transfer system. Any of the embodiments described above may use one or more of the components described with reference to FIG. 22. For example, embodiments using the components of FIG. 22 in conjunction with that described above may provide for identifying relative positions and orientations of the receiver and transmitter devices. An embodiment further comprises a control mechanism operable to control the current in the transmitter coils based on the results of the position and/or orientation determinations (e.g., a controller). The control mechanism may comprise a processor operable to determine an appropriate current supply configuration based on the detected positions/orientations of the transmitter and receiver coil arrangements.

Figure 22:
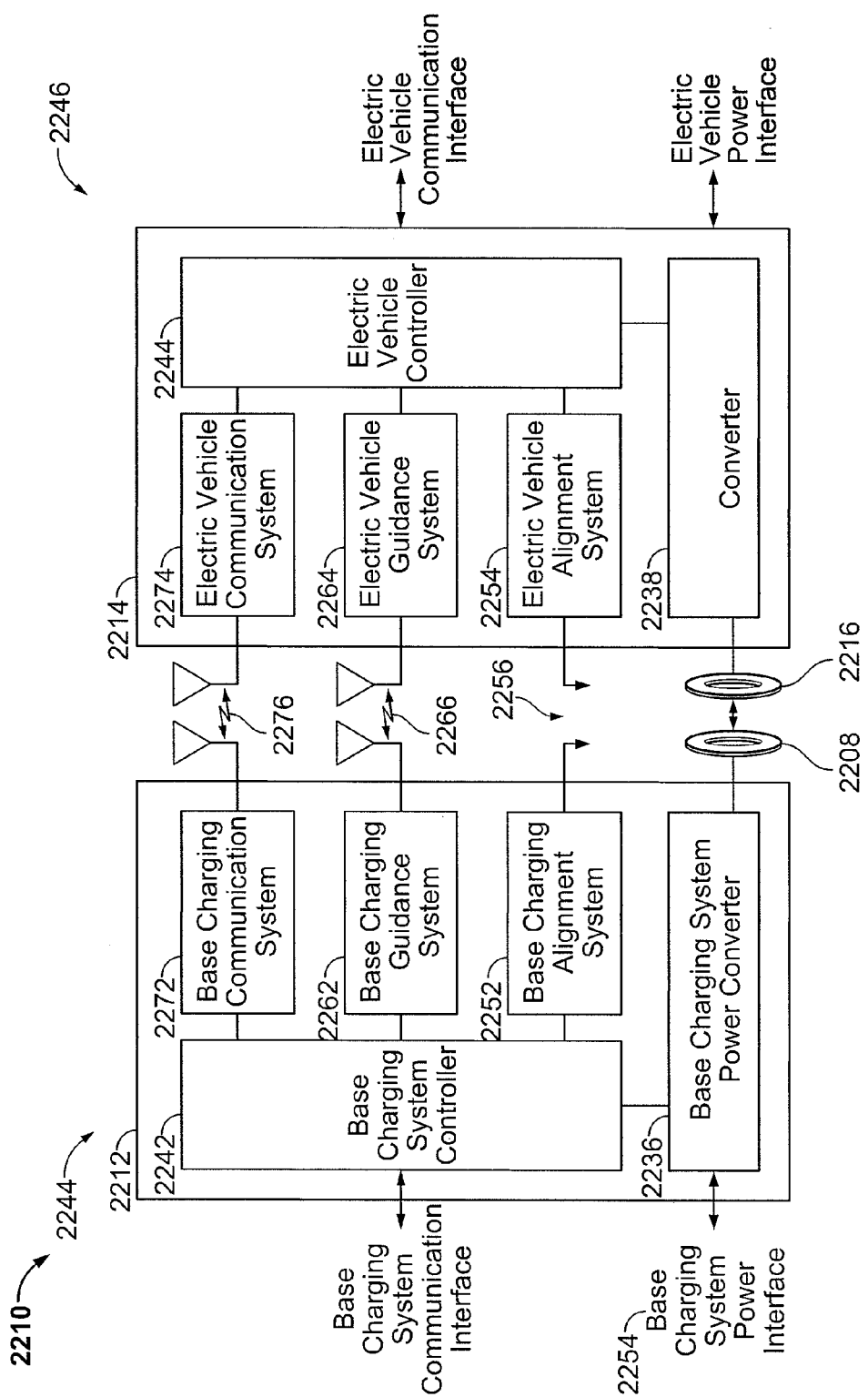
FIG. 22 is a functional block diagram showing exemplary core and ancillary components of the wireless power transfer system of FIG. 1.

FIG. 22 is a functional block diagram showing exemplary core and ancillary components of the wireless power transfer system 100 of FIG. 1. The wireless power transfer system 2210 illustrates a communication link 2276, a guidance link 2266, and alignment systems 2252, 2254 for the base system induction coil 2208 and electric vehicle induction coil 2216. The base system induction coil 2208 may be formed from any of the embodiments of the transmitter coil configurations described above with reference to FIGS. 3-21. The electric vehicle induction coil 2216 may be formed from any of the embodiments of the receiver coil configurations described above with reference to FIGS. 3-21. As described above with reference to FIG. 2, and assuming energy flow towards the electric vehicle 112, in FIG. 22 a base charging system power interface 2254 may be configured to provide power to a charging system power converter 2236 from a power source, such as an AC or DC power supply 126. The base charging system power converter 2236 may receive AC or DC power from the base charging system power interface 2254 to excite the base system induction coil 2208 at or near its resonant frequency. The electric vehicle induction coil 2216, when in the near field coupling-mode region, may receive energy from the near field coupling mode region to oscillate at or near the resonant frequency. The electric vehicle power converter 2238 converts the oscillating signal from the electric vehicle induction coil 2216 to a power signal suitable for charging a battery via the electric vehicle power interface.

The base wireless charging system 2212 includes a base charging system controller 2242 and the electric vehicle charging system 2214 includes an electric vehicle controller 2244. The base charging system controller 2242 may include a base charging system communication interface 162 to other systems (not shown) such as, for example, a computer, and a power distribution center, or a smart power grid. The electric vehicle controller 2244 may include an electric vehicle communication interface to other systems (not shown) such as, for example, an on-board computer on the vehicle, other battery charging controller, other electronic systems within the vehicles, and remote electronic systems.

The base charging system controller 2242 and electric vehicle controller 2244 may include subsystems or modules for specific application with separate communication channels. These communications channels may be separate physical channels or separate logical channels. As non-limiting examples, a base charging alignment system 2252 may communicate with an electric vehicle alignment system 2254 through a communication link 2276 to provide a feedback mechanism for more closely aligning the base system induction coil 2208 and electric vehicle induction coil 2216, either autonomously or with operator assistance. Similarly, a base charging guidance system 2262 may communicate with an electric vehicle guidance system 2264 through a guidance link to provide a feedback mechanism to guide an operator in aligning the base system induction coil 2208 and electric vehicle induction coil 2216. In addition, there may be separate general-purpose communication links (e.g., channels) supported by base charging communication system 2272 and electric vehicle communication system 2274 for communicating other information between the base wireless power charging system 2212 and the electric vehicle charging system 2214. This information may include information about electric vehicle characteristics, battery characteristics, charging status, and power capabilities of both the base wireless power charging system 2212 and the electric vehicle charging system 2214, as well as maintenance and diagnostic data for the electric vehicle 112. These communication channels may be separate physical communication channels such as, for example, Bluetooth, zigbee, cellular, etc. These systems may operate to determine and communicate the relative positions and/or the relative orientations of the base system induction coil 2208 and electric vehicle induction coil 2216 in any appropriate manner.

To communicate between a base wireless charging system 2212 and an electric vehicle charging system 2214, the wireless power transfer system 2210 may use both in-band signaling and an RF data modem (e.g., Ethernet over radio in an unlicensed band). The out-of-band communication may provide sufficient bandwidth for the allocation of value-add services to the vehicle user/owner. A low depth amplitude or phase modulation of the wireless power carrier may serve as an in-band signaling system with minimal interference.

In addition, some communication may be performed via the wireless power link without using specific communications antennas. For example, the wireless power induction coils 2208 and 2216 may also be configured to act as wireless communication transmitters. Thus, some embodiments of the base wireless power charging system 2212 may include a controller (not shown) for enabling keying type protocol on the wireless power path. By keying the transmit power level (amplitude shift keying) at predefined intervals with a predefined protocol, the receiver may detect a serial communication from the transmitter. The base charging system power converter 2236 may include a load sensing circuit (not shown) for detecting the presence or absence of active electric vehicle receivers in the vicinity of the near field generated by the base system induction coil 2208. By way of example, a load sensing circuit monitors the current flowing to the power amplifier, which is affected by the presence or absence of active receivers in the vicinity of the near field generated by base system induction coil 104a. Detection of changes to the loading on the power amplifier may be monitored by the base charging system controller 2242 for use in determining whether to enable the oscillator for transmitting energy, to communicate with an active receiver, or a combination thereof.

To enable wireless high power transfer, some embodiments may be configured to transfer power at a frequency in the range from 10-60 kHz. This low frequency coupling may allow highly efficient power conversion that may be achieved using solid state devices. In addition, there may be less coexistence issues with radio systems compared to other bands.

Figure 23:
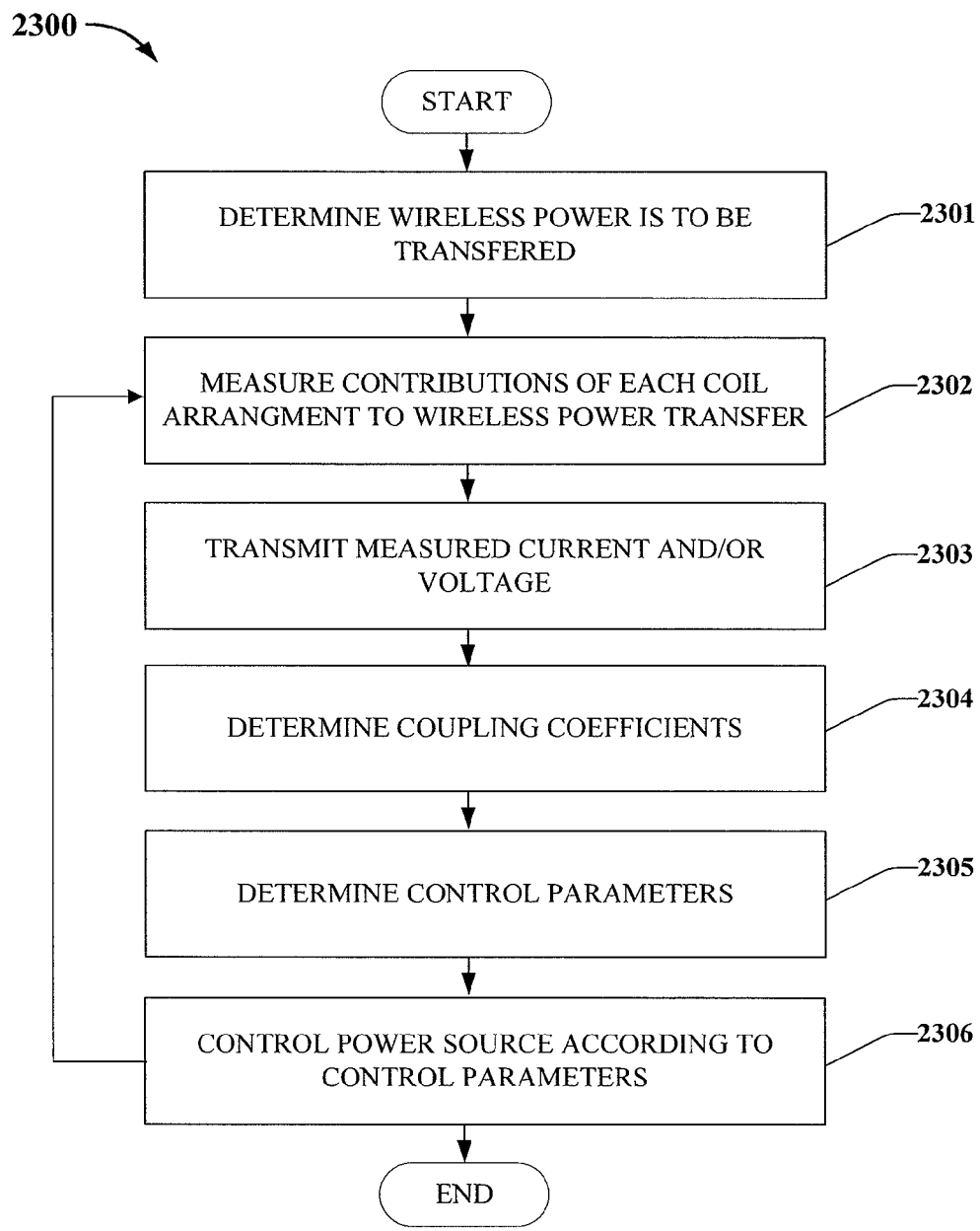
FIG. 23 is a flow chart of an exemplary method of operating a wireless power transfer system, in accordance with an exemplary embodiment.

FIG. 23 is a flow chart illustrating a method 2300 of operating a wireless power transfer system according to an exemplary embodiment. Operation is described with reference to the components of FIG. 22.

At block 2301, a wireless power transfer system, such as wireless power transfer system 2200, determines that power is to be wirelessly transferred between a transmitter side such as the base wireless charging system 2209, and a receiver side such as the electric vehicle charging system 2211. It should be appreciated that determining that power is to be transferred may be achieved in a variety of ways. For example, the electric vehicle controller 2212 may transmit a signal notifying the base charging system controller 2210 of its presence in the vicinity. In another exemplary embodiment, the base charging system controller 2210 may monitor the load sensing circuit in order to detect the presence or absence of active receivers in the vicinity as discussed above. Similarly, this technique may be performed on the electric vehicle side.

In exemplary embodiments, additional information may be transferred between the transmitter and receiver sides as to desired operating conditions. For example, electric vehicle controller 2212 may transmit details regarding the configuration of the electric vehicle charging system 2211 to the base charging system controller 2210, and/or preferred parameters for wireless power transfer. Such details may enable losses on the receiver side, or the risk of unacceptable stress on components of the receiver, to be determined. This information may be used in determining control parameters for wireless power transfer—as discussed below.

On determining that power is to be transferred, at block 2302 the contributions of each primary coil arrangement to wireless power transfer to the secondary coil arrangement is measured. For example, the base charging system controller 2210 may instruct the base charging system power converter 2207 to supply power to the first primary coil arrangement 1903 for e.g., 250 milliseconds. During this period a measurement is made of the short circuit current across the secondary coil arrangement 1902 resulting from wireless power transfer, and/or the open circuit voltage at same—depending on the tuning topology. This may be repeated for the second primary coil arrangement 1904, and then both of the primary coil arrangements simultaneously.

At block 2303 the measured voltage and/or current is transmitted to a mechanism for determining coupling coefficients between each of the primary coil arrangements 1903 and 1904, and at the secondary coil arrangement 1902 (e.g., a processor). For example, the voltage and/or current may be measured by the electric vehicle power converter 2208 or separate devices (not shown), and transmitted to the electric vehicle controller 2212. In other embodiments the voltage and/or current measurements may be transmitted to the base charging system controller 2210, whether directly from the mechanism for measuring the voltage and/or current through a communication link (such as between electric vehicle communication system 2216 and base charging communication system 2215), or via an intermediary device such as the electric vehicle controller 2212.

At block 2304, the mechanism for determining coupling coefficients (for example base charging system controller 2210 or electric vehicle controller 2212) uses the voltage and/or current measurements to determine a coupling coefficient between each of the primary coil arrangements 1903 and 1904, and at the secondary coil arrangement 1902.

At block 2305, a mechanism for determining control parameters for delivery of current to the primary coil arrangements 1903 and 1904 uses the coupling coefficients to determine control parameters. The mechanisms for determining the control parameters may be any suitable processor—for example the base charging system controller 2210 or the electric vehicle controller 2212.

The mechanism for determining the control parameters may do so based on the coupling coefficients and known system parameters such as relative resistance of the primary coil arrangements. Exemplary considerations dictating the control parameters are discussed previously with reference to FIG. 19, FIG. 20, FIG. 21A, FIG. 21B, and FIG. 21C.

Further, in exemplary embodiments the control parameters may be based at least in part on the information relating to operation of the receiver, for example electric vehicle charging system 2211, as previously discussed.

Further, in exemplary embodiments the control parameters may be based at least in part on the desired operating conditions of the receiver, for example electric vehicle charging system 2211. In other words, an electric vehicle may be configured with desired operating conditions of the receiver. In some embodiments, determination of which control parameters to use may comprise communication between the transmitter and receiver systems to arrive at an agreement between the systems. In an exemplary embodiment, the electric vehicle charging system and the base wireless charging system 2209 may exchange information on their preferred parameters. In such an embodiment, the electric vehicle charging system and the base wireless charging system 2209 may select agreed upon parameters to operate—for example, the agreed parameters may be selected based on the best (i.e., most optimal) conditions which both are capable of operating at. Alternatively the agreed parameters may be based on the lowest conditions which the electric vehicle is capable of operating at.

In some embodiments, achieving desired operating conditions at either the receiver or transmitter may be prioritized. For example, conditioning the power received electric vehicle charging system 2211 to a desired current may be prioritized over efficiency of the base charging system power converter 2207. It should be appreciated that the determination of the control parameters may be influenced by a large number of factors, and that the decision making may be highly dependent on design parameters for a particular wireless power transfer system.

At block 2306 a mechanism for delivering current to the primary coil arrangements 1903 and 1904, for example base charging system power converter 2207, is controlled according to the determined control parameters. For example, the base charging system controller 2210 may directly control the magnitude and/or phase of the respective currents supplied to the primary coil arrangements 1903 and 1904 by power converter 2207. In another embodiment the electric vehicle controller 2212 may transmit desired control parameters to the base charging system controller 2210 in order to indirectly control the power converter 2207.

The system may return to block 2302 periodically, or on determining that a change in the physical relationship between the primary and secondary coil arrangements has occurred.

Figure 24:
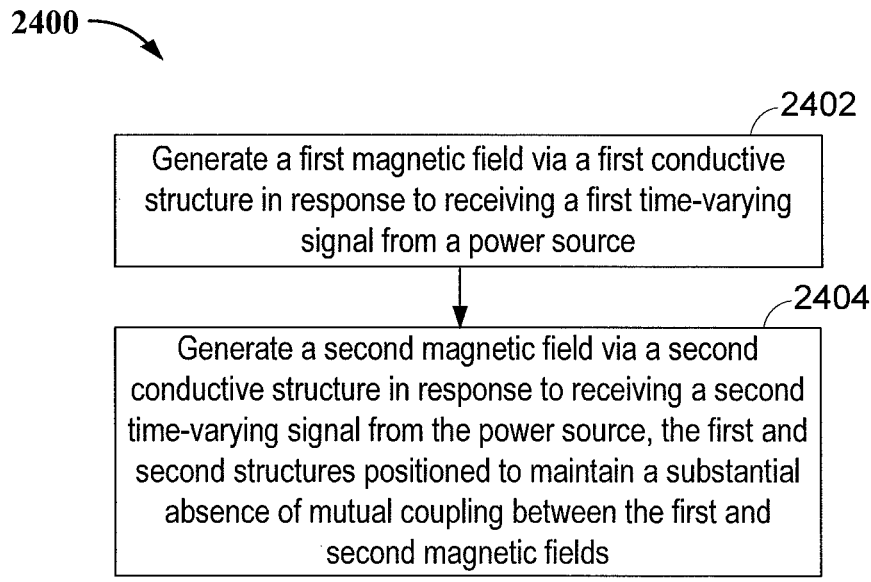
FIG. 24 is a flow chart of another exemplary method of operating a wireless power transfer system, in accordance with an embodiment.

FIG. 24 is a flow chart of another exemplary method 2400 of operating a wireless power transfer system, in accordance with an embodiment. At block 2402, a first magnetic field is generated via a first conductive structure 501 (FIG. 5) in response to receiving a time-varying signal from a power source. At block 2404, a second magnetic field is generated via a second conductive structure 502 in response to receiving a second time-varying signal from the power source. The first and second structures are positioned to maintain a substantial absence of mutual coupling between the first and second magnetic fields. In one embodiment, the method 2400 may be performed by a base wireless power charging system 202 (FIG. 2) that includes the coils 501 and 502 of FIG. 5.

Figure 25:
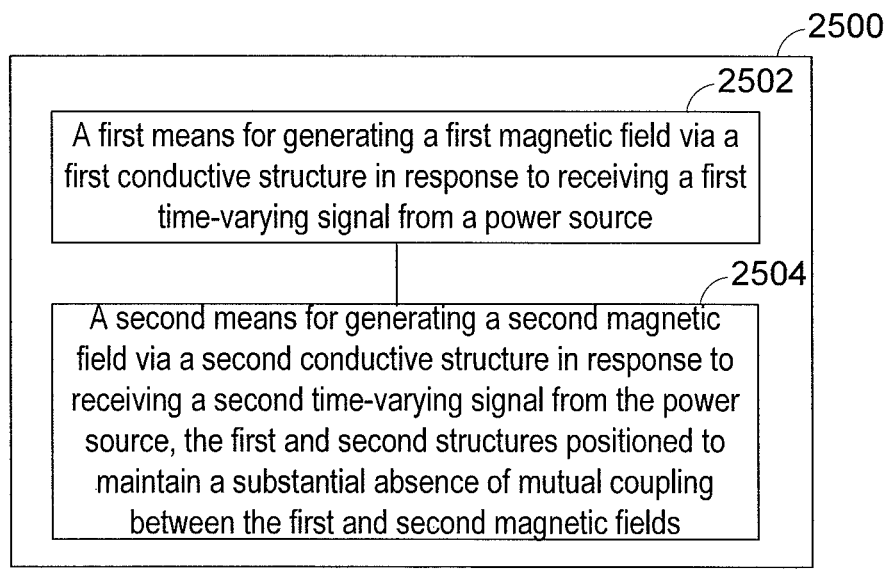
FIG. 25 is a functional block diagram of a wireless power transmitter, in accordance with an embodiment.

FIG. 25 is a functional block diagram of a wireless power transmitter 2500, in accordance with an embodiment. The wireless power transmitter 2500 may include means 2502 and 2504 for the various actions discussed with respect to FIGS. 1-24.

Figure 26:
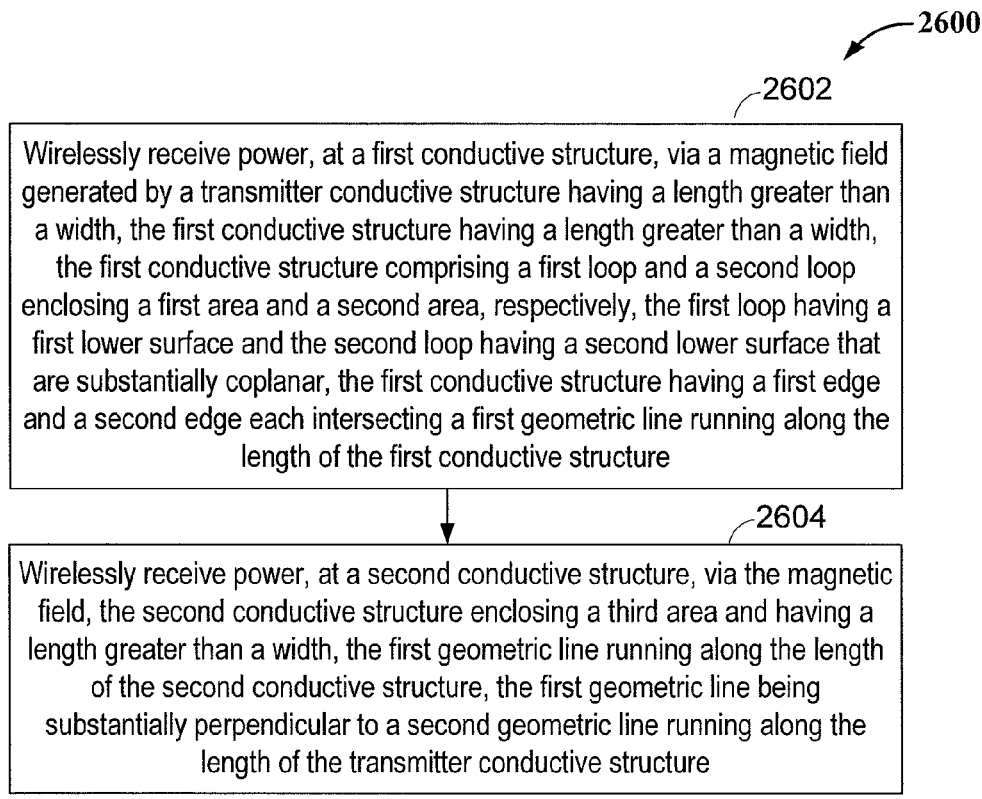
FIG. 26 is a flow chart of another exemplary method of wirelessly receiving power, in accordance with an embodiment.

FIG. 26 is a flow chart of another exemplary method 2600 of wirelessly receiving power, in accordance with an embodiment. At block 2602, power is wirelessly received at a first conductive structure 1505a-b (FIG. 15), via a magnetic field generated by a transmitter conductive structure 1501 having a length greater than a width. The first conductive structure 1505a-b has a length greater than a width. The first conductive structure 1505a-b includes a first loop 1505a and a second loop 1505b enclosing a first area and a second area, respectively. The first loop 1505a has a first lower surface and the second loop 1505b has a second lower surface that are substantially coplanar. The first conductive structure 1505a-b has a first edge and a second edge each intersecting a first geometric line running along the length of the first conductive structure 15051-b. At block 2604, power is wirelessly received, at a second conductive structure 1506, via the magnetic field. The second conductive structure 1506 encloses a third area and having a length greater than a width. The first geometric line runs along the length of the second conductive structure 1506. The first geometric line is substantially perpendicular to a second geometric line running along the length of the transmitter conductive structure 1501. In one embodiment, the method 2600 may be performed by a base wireless power charging system 1500 (FIG. 2) that includes the coils 1502.

Figure 27:
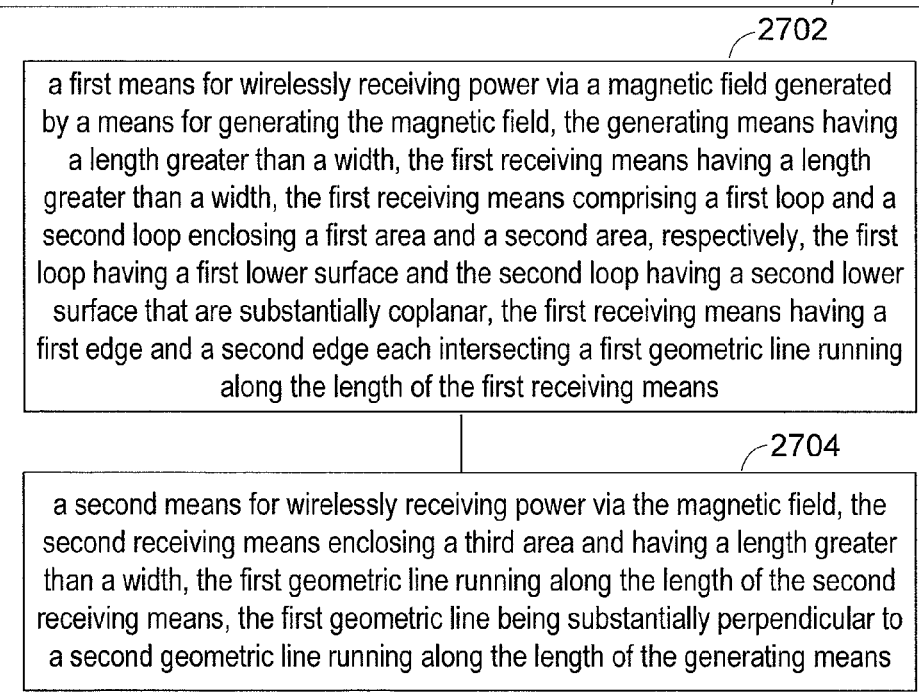
FIG. 27 is a functional block diagram of a wireless power receiver, in accordance with an embodiment.

FIG. 27 is a functional block diagram of a wireless power receiver 2700, in accordance with an embodiment. The wireless power receiver 2700 may include means 2702 and 2704 for the various actions discussed with respect to FIGS. 1-26.

Figure 28:
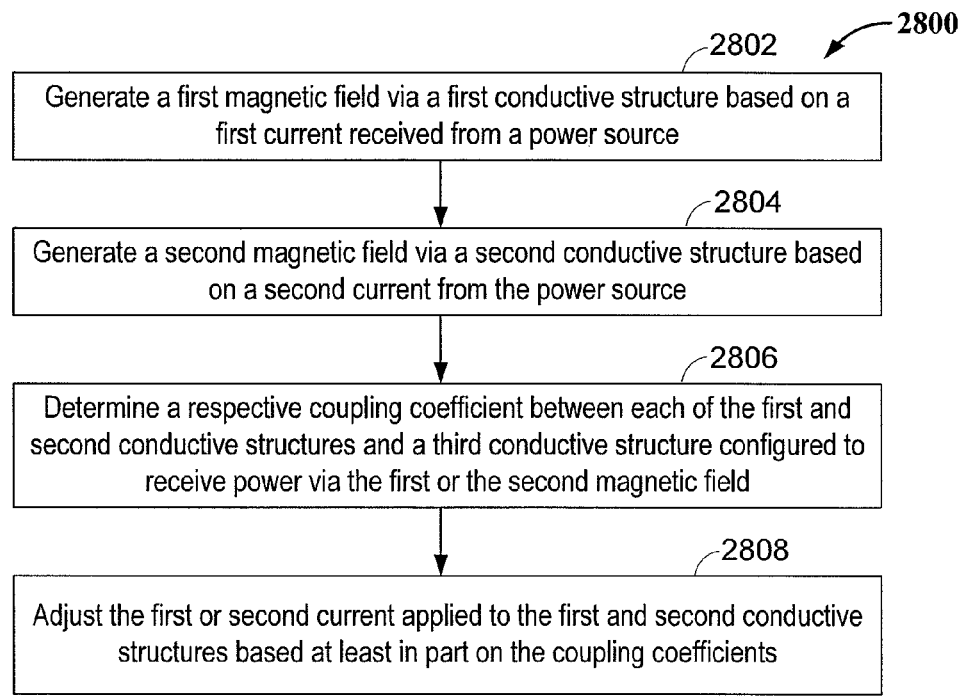
FIG. 28 is a flow chart of another exemplary method of operating a wireless power transfer system, in accordance with an embodiment.

FIG. 28 is a flow chart of another exemplary method 2800 of operating a wireless power transfer system, in accordance with an embodiment. At block 2802, a first magnetic field is generated via a first conductive structure 501 (FIG. 5) based on a first current received from a power source. At block 2804 a second magnetic field is generated via a second conductive structure 502 based on a second current from the power source. At block 2806, a respective coupling coefficient between each of the first and second conductive structures and a third conductive structure configured to receive power via the first or the second magnetic field is determined. At block 2808, the first or second current applied to the first and second conductive structures is adjusted based at least in part on the coupling coefficients. In one embodiment, the method 2800 may be performed by a base wireless power charging system 202 (FIG. 2) that includes the coils 501 and 502 of FIG. 5.

Figure 29:
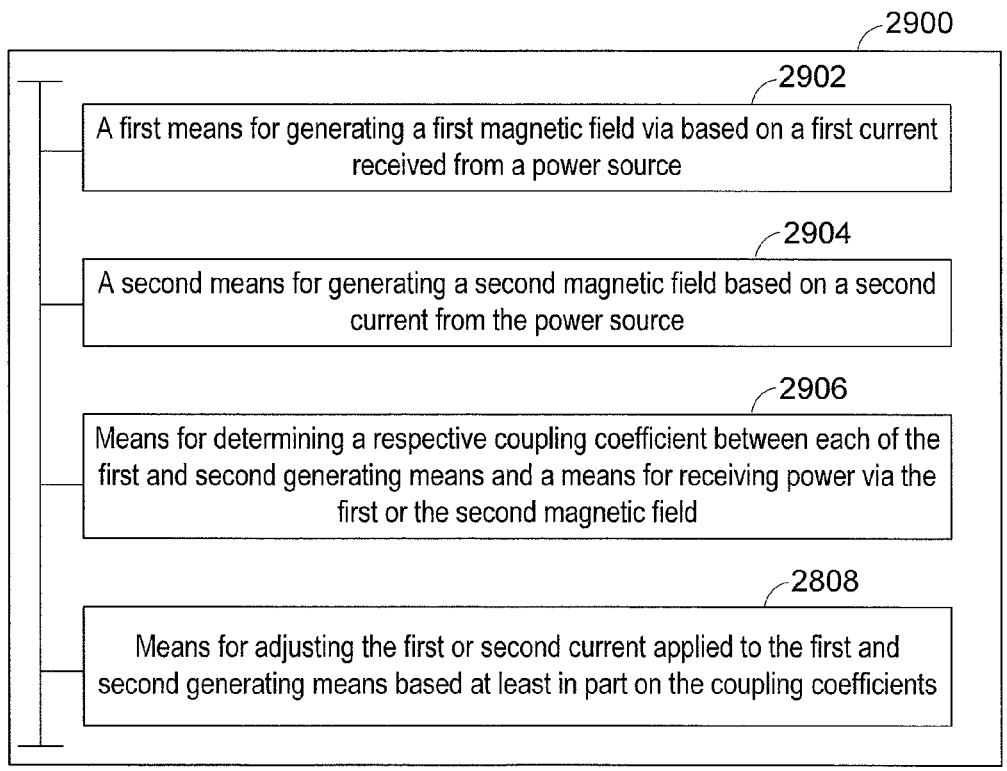
FIG. 29 is a functional block diagram of a wireless power transmitter, in accordance with an embodiment.

FIG. 29 is a functional block diagram of a wireless power transmitter 2900, in accordance with an embodiment. The wireless power transmitter 2900 may include means 2902, 2904, 2906, and 2908 for the various actions discussed with respect to FIGS. 1-28.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations. For example, a means for generating may comprise a conductive structure. A means for applying electric current may comprise a power supply and the like. A means for controlling may comprise a processor and the like.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the embodiments of the invention.

The various illustrative blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media. The processor and the storage medium may reside in an ASIC. The ASIC may reside in a user terminal. In the alternative, the processor and the storage medium may reside as discrete components in a user terminal.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

Various modifications of the above described embodiments will be readily apparent, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus for wirelessly receiving power, the apparatus comprising
   a first conductive structure configured to wirelessly receive power via a magnetic field generated by a transmitter conductive structure having a length greater than a width, the first conductive structure having a length greater than a width, the first conductive structure comprising a first loop and a second loop enclosing a first area and a second area, respectively, the first loop having a first lower surface and the second loop having a second lower surface that are substantially coplanar, the first conductive structure having a first edge and a second edge each intersecting a first geometric line running along the length of the first conductive structure; and
   a second conductive structure configured to wirelessly receive power via the magnetic field, the second conductive structure enclosing a third area and having a length greater than a width, the first geometric line running along the length of the second conductive structure,
   the first geometric line being substantially perpendicular to a second geometric line running along the length of the transmitter conductive structure.

2. The apparatus of claim 1, wherein the second conductive structure is positioned such that a center of the third area enclosed by the second conductive structure is positioned substantially over a point between the first loop and the second loop.

3. The apparatus of claim 1, wherein the first conductive structure comprises one of:
   a first coil wound to enclose the first area and the second area; or
   a first and a second coil each enclosing the first area and the second area, respectively,
   and wherein the second conductive structure comprises a third coil wound to enclose the third area.

4. The apparatus of claim 1, wherein the first conductive structure and the second conductive structure are positioned to maintain a substantial absence of mutual coupling between the first conductive structure and the second conductive structure.

5. The apparatus of claim 4, wherein the substantial absence of mutual coupling occurs at least in part when a net sum of a magnetic field of the first conductive structure that intersects the second conductive structure is substantially zero.

6. The apparatus of claim 1, wherein the first and second conductive structures collectively have a first center point defined by a first geometric rectangle covering a surface area of the first and second conductive structures, wherein the transmitter conductive structure has a second center point defined by a second geometric rectangle covering a surface area of the transmitter conductive structure, and wherein a set of points, defined by offset distances between the first and second center points, in which an amount of coupling is above a threshold is substantially rectangular, the amount of coupling defined at least in part by a value derived from a first coupling coefficient measuring coupling between the first conductive structure and the transmitter conductive structure and a second coupling coefficient measuring coupling between the second conductive structure and the transmitter conductive structure.

7. The apparatus of claim 1, wherein the first and second conductive structures are configured to be affixed to an electric vehicle, the first geometric line being substantially perpendicular to a longitudinal axis of the electric vehicle.

8. The apparatus of claim 1, wherein the first and second conductive structures are tunable and operable at a resonant frequency.

9. The apparatus of claim 1, further comprising a receive circuit coupled to the first and second conductive structures and configured to power or charge an electric vehicle based on at least a portion of a combination of the power received via the first and second conductive structures.

10. The apparatus of claim 1, wherein the first conductive structure has a substantially horizontally polarized magnetic moment, and wherein the second conductive structure has a substantially vertically polarized moment.

11. A method of wirelessly receiving power, the method comprising
    wirelessly receiving power, at a first conductive structure, via a magnetic field generated by a transmitter conductive structure having a length greater than a width, the first conductive structure having a length greater than a width, the first conductive structure comprising a first loop and a second loop enclosing a first area and a second area, respectively, the first loop having a first lower surface and the second loop having a second lower surface that are substantially coplanar, the first conductive structure having a first edge and a second edge each intersecting a first geometric line running along the length of the first conductive structure; and
    wirelessly receiving power, at a second conductive structure, via the magnetic field, the second conductive structure enclosing a third area and having a length greater than a width, the first geometric line running along the length of the second conductive structure,
    the first geometric line being substantially perpendicular to a second geometric line running along the length of the transmitter conductive structure.

12. The method of claim 11, wherein the second conductive structure is positioned such that a center of the third area enclosed by the second conductive structure is positioned substantially over a point between the first loop and the second loop.

13. The method of claim 11, wherein the first conductive structure comprises one of:
    a first coil wound to enclose the first area and the second area; or
    a first and a second coil each enclosing the first area and the second area, respectively,
    and wherein the second conductive structure comprises a third coil wound to enclose the third area.

14. The method of claim 11, wherein the first conductive structure and the second conductive structure are positioned to maintain a substantial absence of mutual coupling between the first conductive structure and the second conductive structure.

15. The method of claim 14, wherein the substantial absence of mutual coupling occurs at least in part when a net sum of a magnetic field of the first conductive structure that intersects the second conductive structure is substantially zero.

16. The method of claim 11, wherein the first and second conductive structures collectively have a first center point defined by a first geometric rectangle covering a surface area of the first and second conductive structures, wherein the transmitter conductive structure has a second center point defined by a second geometric rectangle covering a surface area of the transmitter conductive structure, and wherein a set of points, defined by offset distances between the first and second center points, in which an amount of coupling is above a threshold is substantially rectangular, the amount of coupling defined at least in part by a value derived from a first coupling coefficient measuring coupling between the first conductive structure and the transmitter conductive structure and a second coupling coefficient measuring coupling between the second conductive structure and the transmitter conductive structure.

17. The method of claim 11, wherein the first and second conductive structures are configured to be affixed to an electric vehicle, the first geometric line being substantially perpendicular to a longitudinal axis of the electric vehicle.

18. The method of claim 11, wherein the first and second conductive structures are tunable and operable at a resonant frequency.

19. The method of claim 11, further comprising powering or charging an electric vehicle based on at least a portion of a combination of the power received via the first and second conductive structures.

20. The method of claim 11, wherein the first conductive structure has a substantially horizontally polarized magnetic moment, and wherein the second conductive structure has a substantially vertically polarized moment.

21. An apparatus for wirelessly receiving power, the apparatus comprising
a first means for wirelessly receiving power via a magnetic field generated by a means for generating the magnetic field, the generating means having a length greater than a width, the first receiving means having a length greater than a width, the first receiving means comprising a first loop and a second loop enclosing a first area and a second area, respectively, the first loop having a first lower surface and the second loop having a second lower surface that are substantially coplanar, the first receiving means having a first edge and a second edge each intersecting a first geometric line running along the length of the first receiving means; and
a second means for wirelessly receiving power via the magnetic field, the second receiving means enclosing a third area and having a length greater than a width, the first geometric line running along the length of the second receiving means,
the first geometric line being substantially perpendicular to a second geometric line running along the length of the generating means.

22. The apparatus of claim 21, wherein the second receiving means is positioned such that a center of the third area enclosed by the second receiving means is positioned substantially over a point between the first loop and the second loop.

23. The apparatus of claim 21, wherein the first receiving means comprises one of:
a first coil wound to enclose the first area and the second area; or
a first and a second coil each enclosing the first area and the second area, respectively,
and wherein the second receiving means comprises a third coil wound to enclose the third area.

24. The apparatus of claim 21, wherein the first receiving means and the second receiving means are positioned to maintain a substantial absence of mutual coupling between the first receiving means and the second receiving means.

25. The apparatus of claim 21, wherein the first and second receiving means collectively have a first center point defined by a first geometric rectangle covering a surface area of the first and second receiving means, wherein the generating means has a second center point defined by a second geometric rectangle covering a surface area of the generating means, and wherein a set of points, defined by offset distances between the first and second center points, in which an amount of coupling is above a threshold is substantially rectangular, the amount of coupling defined at least in part by a value derived from a first coupling coefficient measuring coupling between the first receiving means and the generating means and a second coupling coefficient measuring coupling between the second receiving means and the generating means.

26. The apparatus of claim 21, wherein the first and second receiving means are configured to be affixed to an electric vehicle, the first geometric line being substantially perpendicular to a longitudinal axis of the electric vehicle.

27. The apparatus of claim 21, wherein the first and second receiving means are tunable and operable at a resonant frequency.

28. The apparatus of claim 21, further comprising a receive circuit coupled to the first and second receiving means and configured to power or charge an electric vehicle based on at least a portion of a combination of the power received via the first and second receiving means.

29. The apparatus of claim 21, wherein the first receiving means has a substantially horizontally polarized magnetic moment, and wherein the second receiving means has a substantially vertically polarized moment.

30. A system for wirelessly transferring power, the system comprising:
a power supply configured to output a time-varying signal; and
a transmitter conductive structure configured to receive the time-varying signal and to generate a magnetic field for wirelessly transferring power to a receiver device, the transmitter conductive structure having a length greater than a width,
the receiver device comprising a first conductive structure configured to wirelessly receive power via the magnetic field, the first conductive structure having a length greater than a width, the first conductive structure comprising a first loop and a second loop enclosing a first area and a second area, respectively, the first loop having a first lower surface and the second loop having a second lower surface that are substantially coplanar, the first conductive structure having a first edge and a second edge each intersecting a first geometric line running along the length of the first conductive structure, the receiver device further comprising a second conductive structure configured to wirelessly receive power via the magnetic field, the second conductive structure enclosing a third area and having a length greater than a width, the first geometric line running along the length of the second conductive structure, the first geometric line being substantially perpendicular to a second geometric line running along the length of the transmitter conductive structure.

31. The system of claim 30, wherein the first conductive structure and the second conductive structure of the receiver device are positioned to maintain a substantial absence of mutual coupling between the first conductive structure and the second conductive structure.

32. The system of claim 30, wherein the first and second conductive structures collectively have a first center point defined by a first geometric rectangle covering a surface area of the first and second conductive structures, wherein the transmitter conductive structure has a second center point defined by a second geometric rectangle covering a surface area of the transmitter conductive structure, and wherein a set of points, defined by offset distances between the first and second center points, in which an amount of coupling is above a threshold is substantially rectangular, the amount of coupling defined at least in part by a value derived from a first coupling coefficient measuring coupling between the first conductive structure and the transmitter conductive structure and a second coupling coefficient measuring coupling between the second conductive structure and the transmitter conductive structure.

* * * * *